United States Patent
Matsukura

(10) Patent No.: US 8,169,137 B2
(45) Date of Patent: May 1, 2012

(54) LIGHT SOURCE AND DEVICE USING ELECTROLUMINESCENCE ELEMENT

(75) Inventor: Hideki Matsukura, Kanagawa (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 30 days.

(21) Appl. No.: 12/834,275

(22) Filed: Jul. 12, 2010

(65) Prior Publication Data
US 2011/0013379 A1    Jan. 20, 2011

(30) Foreign Application Priority Data
Jul. 14, 2009 (JP) .................. 2009-165396

(51) Int. Cl.
*H01J 1/62* (2006.01)
(52) U.S. Cl. ........................ 313/503; 313/498
(58) Field of Classification Search .......... 313/498–512; 428/917, 690; 445/23–25
See application file for complete search history.

(56) References Cited

U.S. PATENT DOCUMENTS

| | | | |
|---|---|---|---|
| 7,045,822 B2 | 5/2006 | Tsuchiya |
| 7,226,332 B2 | 6/2007 | Arai et al. |
| 7,239,081 B2 | 7/2007 | Tsutsui |
| 7,420,203 B2 | 9/2008 | Tsutsui et al. |
| 7,473,923 B2 | 1/2009 | Tsutsui et al. |
| 7,488,985 B2 | 2/2009 | Tsuchiya |
| 7,535,440 B2 | 5/2009 | Nishi et al. |
| 2003/0127967 A1 | 7/2003 | Tsutsui et al. |
| 2004/0096697 A1 | 5/2004 | Tai et al. |
| 2006/0066227 A1 | 3/2006 | Virnich et al. |
| 2006/0197081 A1 | 9/2006 | Tsuchiya |
| 2007/0007516 A1 | 1/2007 | Seo et al. |
| 2007/0243786 A1 | 10/2007 | Tsutsui |
| 2007/0257607 A1 | 11/2007 | Arai et al. |
| 2009/0045738 A1 | 2/2009 | Tsutsui et al. |
| 2009/0165854 A1 | 7/2009 | Yamazaki et al. |
| 2009/0195155 A1 | 8/2009 | Tsuchiya |
| 2010/0328928 A1 | 12/2010 | Matsukura |

FOREIGN PATENT DOCUMENTS

| | | |
|---|---|---|
| JP | 2004-134282 A | 4/2004 |
| JP | 2008210676 A | 9/2008 |
| JP | 2008210678 A | 9/2008 |

OTHER PUBLICATIONS

J. Kido et al. "Multilayer White Light-Emitting Organic Electroluminescent Device"; Science, vol. 267, No. 5202; pp. 1332-1334; Mar. 3, 1995.

*Primary Examiner* — Joseph L Williams
(74) *Attorney, Agent, or Firm* — Fish & Richardson P.C.

(57) ABSTRACT

Deterioration of the whole electroluminescence layer which is caused by moisture penetration through the electroluminescence layer because of a pinhole in an electrode is prevented. A plurality of island-shaped electroluminescence layers is provided. That is, an electroluminescence layer is divided into plural layers. In addition, the plurality of island-shaped electroluminescence layers is interposed between a pair of common electrodes. Accordingly, even when moisture penetrates through one of the island-shaped electroluminescence layers, moisture does not penetrate through another of the island-shaped electroluminescence layers.

21 Claims, 26 Drawing Sheets

5000

5001
5002
5003

PRIOR ART

LIGHT SOURCE AND DEVICE USING ELECTROLUMINESCENCE ELEMENT

BACKGROUND OF THE INVENTION

1. Field of the Invention

The technical field relates to a light source (a lighting device), a device having a light source, and the like.

2. Description of the Related Art

For example, a light source (a lighting device) having an electroluminescence element which is disclosed in Patent Document 1 is known.

[Patent Document 1] Japanese Published Patent Application No. 2004-134282

FIG. 26 is a conceptual drawing of a conventional light source (a lighting device).

In FIG. 26, a first electrode 20, an electroluminescence layer 30, and a second electrode 40 are sequentially stacked over a substrate 10.

When a pinhole 80 is generated in the second electrode 40, moisture 91 and moisture 92 enter through the pinhole 80, leading to deterioration of the electroluminescence layer 30.

The electroluminescence layer 30 is likely to allow moisture to penetrate therethrough.

Therefore, when the pinhole is generated even at one place of the second electrode 40, moisture penetrates through the electroluminescence layer 30, causing deterioration of the whole electroluminescence layer 30.

The deterioration of the whole electroluminescence layer 30 makes it impossible to use the light source itself.

SUMMARY OF THE INVENTION

Structures for solving the above problem are disclosed below.

The structures include a plurality of island-shaped electroluminescence layers.

That is, an electroluminescence layer is divided into plural layers.

By providing the plurality of island-shaped electroluminescence layers between a pair of common electrodes, even when moisture penetrates through one of the island-shaped electroluminescence layers, the moisture does not penetrate through another of the island-shaped electroluminescence layers.

Therefore, it is possible to prevent moisture penetration into the whole electroluminescence layer through the electroluminescence layer.

Note that when the plurality of island-shaped electroluminescence layers is interposed between the pair of common electrodes, the pair of electrodes are in contact with each other at a place where no island-shaped electroluminescence layer is provided, resulting in a short circuit.

Therefore, a nonconductive layer (an insulating layer or a semiconductor layer) is preferably provided at the place where no island-shaped electroluminescence layer is provided.

By the way, the plurality of electroluminescence layers is stacked, and then separated using an intermediate layer, so that the plurality of electroluminescence layers can be operated as being connected in series.

The plurality of electroluminescence layers is operated as being connected in series. Accordingly, luminance can be increased without increasing current density.

Here, there is a case where a conductive layer is used or a nonconductive layer is used as the intermediate layer (Note that the intermediate layer formed using the nonconductive layer is referred to as an intermediate nonconductive layer).

In the case where the nonconductive layer (intermediate nonconductive layer) is used as the intermediate layer, a short circuit between a pair of electrodes can be prevented using the intermediate layer.

That is, in the case where the plurality of electroluminescence layers is formed and separated using the intermediate nonconductive layer, the plurality of electroluminescence layers is divided into island-shaped layers; however, the intermediate nonconductive layer is not divided into island-shaped layers.

The intermediate nonconductive layer is not divided (which means the intermediate nonconductive layer serves as a common layer), so that the intermediate nonconductive layer is arranged at the place where no island-shaped electroluminescence layer is provided; therefore, conduction between a pair of electrodes can be prevented.

Thus, it is possible to provide a light source including a first electrode; a plurality of first island-shaped electroluminescence layers provided over the first electrode; an intermediate nonconductive layer provided to cover the first electrode and the plurality of first island-shaped electroluminescence layers; a plurality of second island-shaped electroluminescence layers provided over the intermediate nonconductive layer; and a second electrode provided to cover the intermediate nonconductive layer and the plurality of second island-shaped electroluminescence layers, and the plurality of first island-shaped electroluminescence layers and the plurality of second island-shaped electroluminescence layers are provided at positions corresponding to one another.

Further, the area of the first island-shaped electroluminescence layer may be different from that of the second island-shaped electroluminescence layer.

Furthermore, the area of the second island-shaped electroluminescence layer may be larger than that of the first island-shaped electroluminescence layer.

Furthermore, it is possible to provide a light source including a first electrode; a plurality of first island-shaped electroluminescence layers provided over the first electrode; a first intermediate nonconductive layer provided to cover the first electrode and the plurality of first island-shaped electroluminescence layers; a plurality of second island-shaped electroluminescence layers provided over the first intermediate nonconductive layer; a second intermediate nonconductive layer provided to cover the first intermediate nonconductive layer and the plurality of second island-shaped electroluminescence layers; a plurality of third island-shaped electroluminescence layers provided over the second intermediate nonconductive layer; and a second electrode provided to cover the second intermediate nonconductive layer and the plurality of third island-shaped electroluminescence layers, and the plurality of first island-shaped electroluminescence layers, the plurality of second island-shaped electroluminescence layers, and the plurality of third island-shaped electroluminescence layers are provided at positions each corresponding to one another.

Preferably, the area of the first island-shaped electroluminescence layer is different from that of the second island-shaped electroluminescence layer, and that of the third island-shaped electroluminescence layer.

Preferably, the area of the third island-shaped electroluminescence layer is larger than that of the first island-shaped electroluminescence layer, and that of the second island-shaped electroluminescence layer.

It is possible to provide a light source including a plurality of units including: a pair of electrodes; a plurality of island-shaped electroluminescence layers stacked between the pair of electrodes; and at least one intermediate nonconductive layer provided at positions for separating each of the island-shaped electroluminescence layers, and all of the units includes the pair of electrodes and the at least one intermediate nonconductive layers in common, and the plurality of island-shaped electroluminescence layers is separately provided for each the unit. Note that when the number of stacked layers of the island-shaped electroluminescence layers is n, the number of the intermediate nonconductive layers is preferably n−1. The n is a natural number of 2 or more.

Preferably, the plurality of island-shaped electroluminescence layers which is stacked each have a different area.

Preferably, one of the pair of electrodes is provided to cover an uppermost island-shaped electroluminescence layer of the plurality of island-shaped electroluminescence layers, and the uppermost island-shaped electroluminescence layer has the largest area in the plurality of island-shaped electroluminescence layers which is stacked.

Preferably, cutting holes forming a dashed line are provided between the plurality of island-shaped electroluminescence layers.

It is possible to provide a device comprising a light source in which a plurality of island-shaped electroluminescence layers is provided between a pair of electrodes and a light guide plate provided to face the light source. The light source is preferably a dual-emission light source.

It is possible to provide a device comprising a light source in which a plurality of island-shaped electroluminescence layers is provided between a pair of electrodes, a display panel, and a light guide plate interposed between the light source and the display panel. The light source is preferably a dual-emission light source.

The structure in which the plurality of island-shaped electroluminescence layers is interposed between the pair of common electrodes can prevent deterioration of the light source.

By providing the nonconductive layer (an insulating layer or a semiconductor layer) at a place where no electroluminescence layer is provided, a short circuit between the pair of electrodes can be prevented.

By using the intermediate nonconductive layer as a nonconductive layer which is placed where no electroluminescence layer is provided, it is not necessary to form a nonconductive layer separately; thus, the number of layers used for the formation of an electroluminescence element can be reduced.

DETAILED DESCRIPTION OF THE INVENTION

Figure 1A:
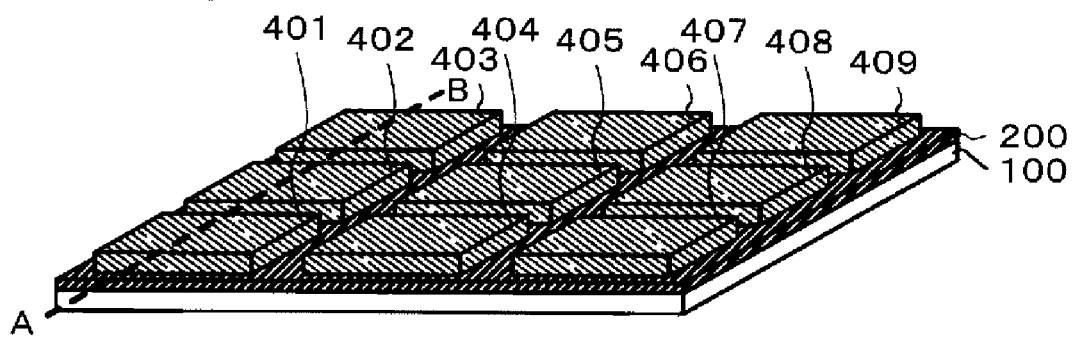
FIGS. 1A and 1B illustrate an example of a method for fabricating a light source.

Embodiments will be described in detail with reference to the accompanying drawings.

It is easily understood by those skilled in the art that modes and details of the present invention can be modified in various ways without departing from the spirit and scope of the invention.

Therefore, the present invention should not be interpreted as being limited to what is described in the embodiments described below.

In the structures to be given below, the same portions or portions having similar functions are denoted by the same reference numerals in different drawings, and explanation thereof will not be repeated.

The following embodiments can be combined with each other, as appropriate.

The number of the island-shaped electroluminescence layers, the number of the intermediate nonconductive layers, the number of stacked island-shaped electroluminescence layers, the number of the connection portions, and the like are not limited to those described in the embodiments or those shown in the drawings.

Embodiment 1

An example of a method for fabricating the light source is described using FIGS. 1A and 1B, FIGS. 2A and 2B, FIGS. 3A and 3B, and FIGS. 4A and 4B.

Note that dashed lines A-B in the cross-sectional views correspond to dashed lines A-B in the perspective views.

Figure 1B:
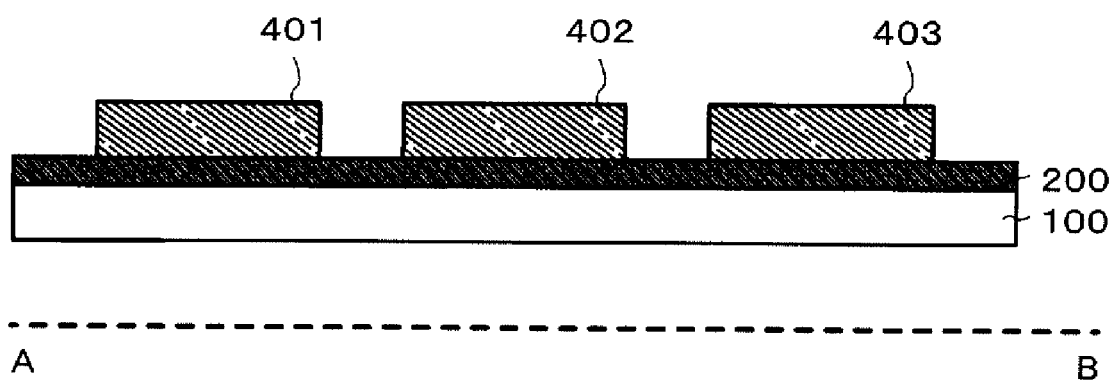

A first electrode 200 is formed over a first substrate 100, and a plurality of first island-shaped electroluminescence layers (island-shaped electroluminescence layers 401 to 409) is formed over the first electrode 200 (FIGS. 1A and 1B).

Figure 2A:
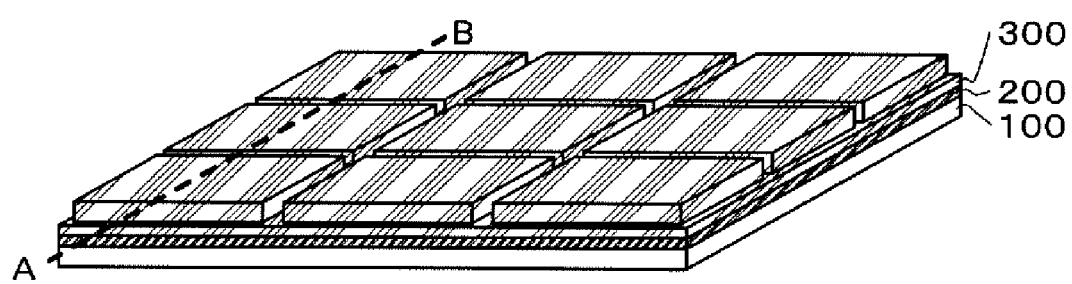
FIGS. 2A and 2B illustrate the example of the method for fabricating the light source.
Figure 2B:
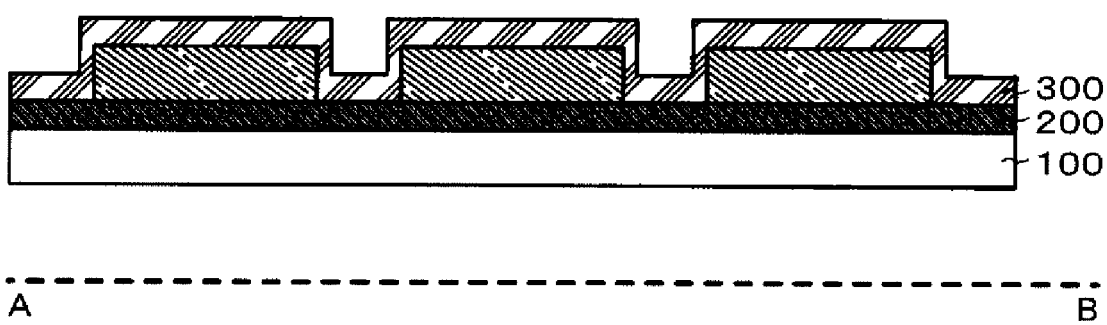

An intermediate nonconductive layer 300 is formed over the plurality of first island-shaped electroluminescence layers and part of the first electrode 200 which is exposed (FIGS. 2A and 2B).

That is to say, the intermediate nonconductive layer 300 is formed to cover the plurality of first island-shaped electroluminescence layers and the first electrode 200 (FIGS. 2A and 2B).

Note that the intermediate nonconductive layer is a layer in which an electron donating material and an electron accepting material are combined, for example. In addition, the intermediate nonconductive layer is an insulating layer or a semiconductor layer.

Figure 3A:
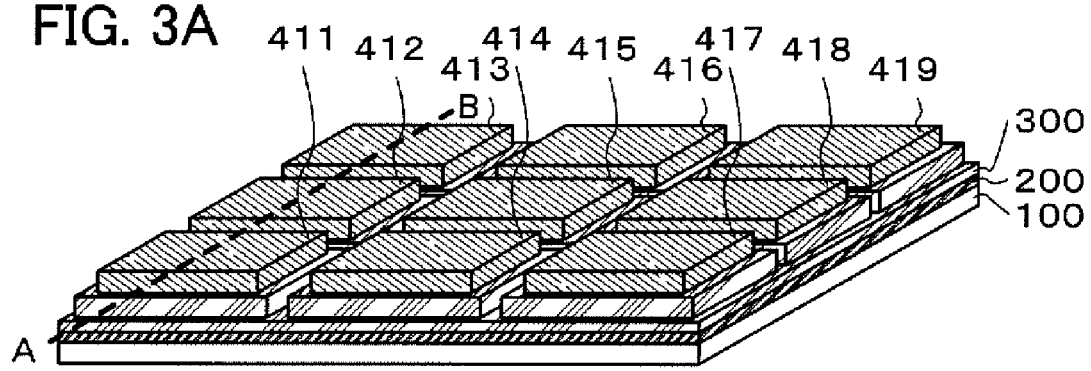
FIGS. 3A and 3B illustrate the example of the method for fabricating the light source.
Figure 3B:
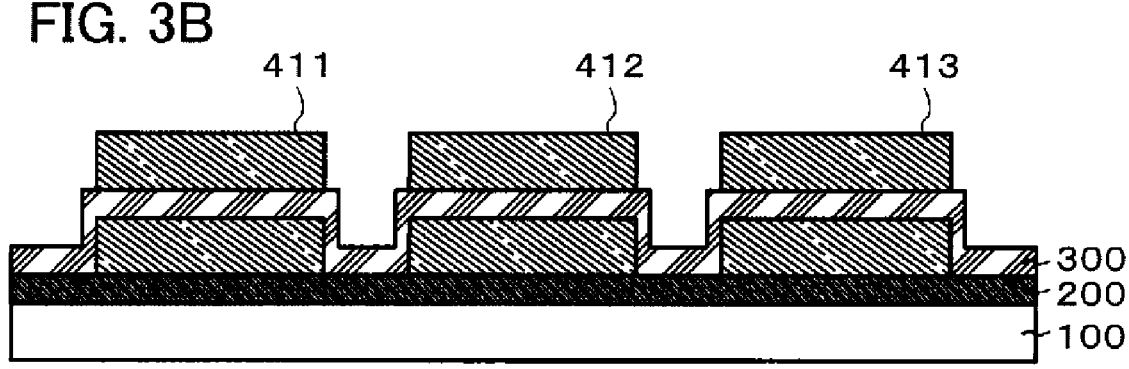

Then, a plurality of second island-shaped electroluminescence layers (island-shaped electroluminescence layers 411 to 419) is formed over the intermediate nonconductive layer 300 (FIGS. 3A and 3B).

The plurality of second island-shaped electroluminescence layers is provided at positions each corresponding to the plurality of first island-shaped electroluminescence layers (FIGS. 3A and 3B). The first island-shaped electroluminescence layers and the second island-shaped electroluminescence layers are only required to be overlapped with one another partially. In FIGS. 3A and 3B, the first island-shaped electroluminescence layers are overlapped with the second island-shaped electroluminescence layers so that the central point of the first island-shaped electroluminescence layer coincides with that of the second island-shaped electroluminescence layer.

Figure 4A:
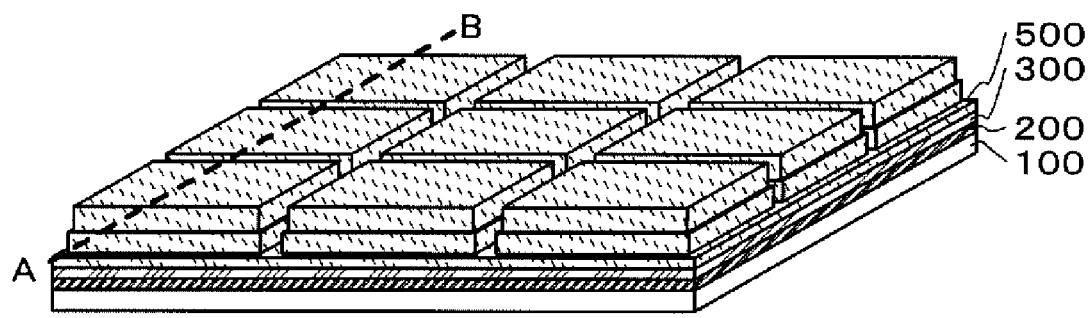
FIGS. 4A and 4B illustrate the example of the method for fabricating the light source.
Figure 4B:
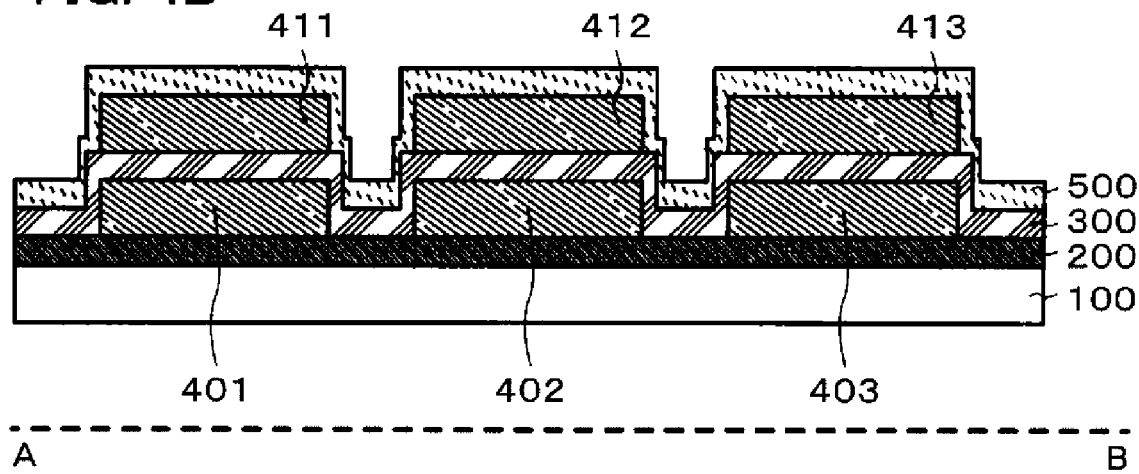

Next, the second electrode 500 is formed over the plurality of second island-shaped electroluminescence layers and part of the intermediate nonconductive layer 300 which is exposed (FIGS. 4A and 4B).

That is, the second electrode 500 is formed to cover the plurality of second island-shaped electroluminescence layers and the intermediate nonconductive layer 300 (FIGS. 4A and 4B).

Note that an intermediate nonconductive layer and a plurality of island-shaped electroluminescence layers may be stacked alternately over the plurality of second island-shaped electroluminescence layers.

In other words, the number of stacked layers of the plurality of island-shaped electroluminescence layers is not limited to two and three or more layers may also be employed.

Moreover, only one layer of the plurality of island-shaped electroluminescence layers may be provided and the intermediate nonconductive layer may be in contact with the entire surface of either the first electrode or the second electrode.

In other words, the plurality of island-shaped electroluminescence layers are provided between the pair of electrodes and the intermediate nonconductive layer is provided between and in contact with one of the pair of electrodes and the plurality of island-shaped electroluminescence layers.

In the above structure, carriers are injected from the intermediate nonconductive layer; thus, the island-shaped electroluminescence layer can emit light.

Then, a second substrate is placed on the second electrode 500 side so as to face the first substrate, and sealing is performed using a sealant.

Note that before the sealing, a protective film which covers the second electrode 500 is preferably provided.

Further, to perform the sealing, only the protective film or both the protective film and a protective film sheet which is provided over the protective film and protects the protective film from friction may be used.

The way in which the sealing is thus performed using the protective film without the second substrate is referred to as film sealing. Performing the film sealing and using a flexible substrate as the first substrate can make the light source thin and lightweight.

This embodiment can be combined with any other embodiment.

Embodiment 2

In this embodiment, materials and a fabrication method are described.

As the first and second substrates, a substrate having a light-transmitting property, a substrate having a light-shielding property or the like can be used.

As the substrate having a light-transmitting property, there are a glass substrate, a quartz substrate, a plastic substrate having a light-transmitting property, and the like.

As the substrate having a light-shielding property, there are a plastic substrate having a light-shielding property, a metal (e.g., stainless steel or aluminum) substrate, a semiconductor substrate (e.g., a silicon wafer), a paper substrate, and the like.

Because light extraction needs to be realized from the light source, at least one of the first and second substrates has a light-transmitting property.

It is needless to say that both the first and second substrates may have a light-transmitting property.

Note that a plastic substrate, a metal substrate, a paper substrate, and the like can easily be made flexible by having a small thickness.

The use of flexible substrates as both the first and second substrates can provide a flexible light source.

The flexible light source is preferable in that it has suppleness and does not easily crack.

Further, the use of a flexible substrate facilitates cutting with scissors, a cutter, or the like, whereby a light source capable of being shaped as desired can also be provided.

The first and second electrodes can be formed using, but not limited to, metal, an oxide conductor, or the like.

For instance, as the first and second electrodes, metal nitride, metal oxide, or a metal alloy which has conductivity may be used.

The first and second electrodes may have a single-layer structure or a stack structure.

Examples of the metal include, but not limited to, tungsten, titanium, aluminum, molybdenum, gold, silver, copper, platinum, palladium, iridium, alkali metal, alkaline-earth metal, and the like.

Examples of the oxide conductor include, but not limited to, indium tin oxide, zinc oxide, zinc oxide containing indium, zinc oxide containing indium and gallium, and the like.

A material having a low work function (e.g., alkali metal, alkaline-earth metal, a magnesium-silver alloy, an aluminum-lithium alloy, or a magnesium-lithium alloy) is preferably applied to a cathode.

A material having a high work function (e.g., an oxide conductor) is preferably applied to an anode.

Because light extraction needs to be realized from the light source, at least one of the first and second electrodes has a light-transmitting property.

When both of the first and second electrodes and both of the first and second substrates have a light-transmitting property, it is possible to provide a light source in which light can be extracted from both surfaces (dual-emission light source).

Note that an oxide conductor has a light-transmitting property.

Further, a light-transmitting property can be realized even with metal, metal nitride, metal oxide, or a metal alloy by a reduction in thickness (a thickness of 50 nm or less is preferable).

When metal, metal nitride, metal oxide, a metal alloy, or the like has a small thickness so as to have a light-transmitting property, the resistance value of the electrode is increased.

Therefore, the resistance value of the electrode can be decreased by using metal, metal nitride, metal oxide, a metal alloy, or the like for a surface in contact with the electroluminescence layer and using an oxide conductor for a surface that is not in contact with the electroluminescence layer.

In particular, a material having a low work function is preferably used as the surface that is in contact with the electroluminescence layer, because both the values of the work function and the resistance can be made suitable in this case.

The intermediate nonconductive layer is a layer (charge generation layer) having a function of injecting holes in a cathode direction and injecting electrons in an anode direction when voltage is applied to an electroluminescence element.

Specifically, a layer in which an electron donating material and an electron accepting material are combined is preferably used as the intermediate nonconductive layer.

Examples of the layer in which the electron donating material and the electron accepting material are combined include, but not limited to, a mixed layer formed of a mixture of an electron donating material and an electron accepting material, a layer formed of a stack of an electron donating material and an electron accepting material, a layer in which a plurality of mixed layers formed of a mixture of an electron donating material and an electron accepting material are stacked, and a layer in which a plurality of mixed layers formed of a mixture of electron donating material and an electron accepting material are stacked and organic compound layers which serve as buffer layers are interposed between the mixed layers.

That is to say, for the intermediate nonconductive layer, any layer which has a function of injecting holes in a cathode direction and injecting electrons in an anode direction when voltage is applied to an electroluminescence element is preferably used.

Furthermore, for the layer in which the electron donating material and the electron accepting material are combined, a layer in which a charge-transfer complex is formed by oxidation-reduction reaction is preferably used.

For example, an organic compound can be used as the electron donating material, and a transition metal oxide can be used as the electron accepting material.

For the transition metal oxide, vanadium oxide, niobium oxide, tantalum oxide, chromium oxide, molybdenum oxide, tungsten oxide, manganese oxide, and rhenium oxide are given; however, the present invention is not limited to these materials.

Examples of the electron donating material with respect to the transition metal oxide include, but not limited to, an amine-based compound (an arylamine compound in particular), a carbazole derivative, aromatic hydrocarbon, Alq, and the like.

Examples of the electron donating material further include, but not limited to, an alkali metal, an alkaline earth metal, an alkali metal compound (an organometallic complex, a metal organic salt, a metal inorganic salt, an oxide, a halide, and the like), an alkaline earth metal compound (an organometallic complex, a metal organic salt, a metal inorganic salt, an oxide, a halide, and the like).

Examples of the electron accepting material with respect to the alkali metal, the alkaline earth metal, the alkali metal compound, and the alkaline earth metal compound include, but not limited to, a metal chelate oxynoid compound, a butadiene derivative, and the like.

Alternatively, a combination of the electron accepting material such as $F_4$-TCNQ or TCNQ, and the electron donating material such as amine-based material (arylamine compound) may be used.

It is needless to say that the combination is not limited to the above, and any layer in which the electron donating material and the electron accepting material are combined can be used as long as a charge-transfer complex can be formed.

The electroluminescence layer has at least a light-emitting layer which contains an organic compound.

The electroluminescence layer may include an electron-injection layer, an electron-transport layer, a hole-injection layer, a hole-transport layer, and the like in addition to the light-emitting layer.

There is no limitation on the electroluminescence layer as long as it exhibits light emission by application of a voltage.

Therefore, the electroluminescence layer may be an organic electroluminescence layer or an inorganic electroluminescence layer.

For the protective film, an inorganic compound such as diamond-like carbon, silicon nitride, silicon oxynitride, silicon nitride oxide, silicon oxide, aluminum nitride, aluminum oxynitride, or aluminum nitride oxide is preferable, because these compounds can block moisture; however the present invention is not limited to these materials. The protective film may have a single-layer structure or a stack structure.

Note that as a method of processing and shaping the intermediate nonconductive layer, the electroluminescence layer, the first and second electrodes, or the like as desired, a method employing photolithography, a method using a metal mask, or the like may preferably be used. Alternatively, an inkjet method or the like may be used to directly form a pattern (the plurality of island-shaped electroluminescence layers).

This embodiment can be combined with any other embodiment.

Embodiment 3

Figure 5A:
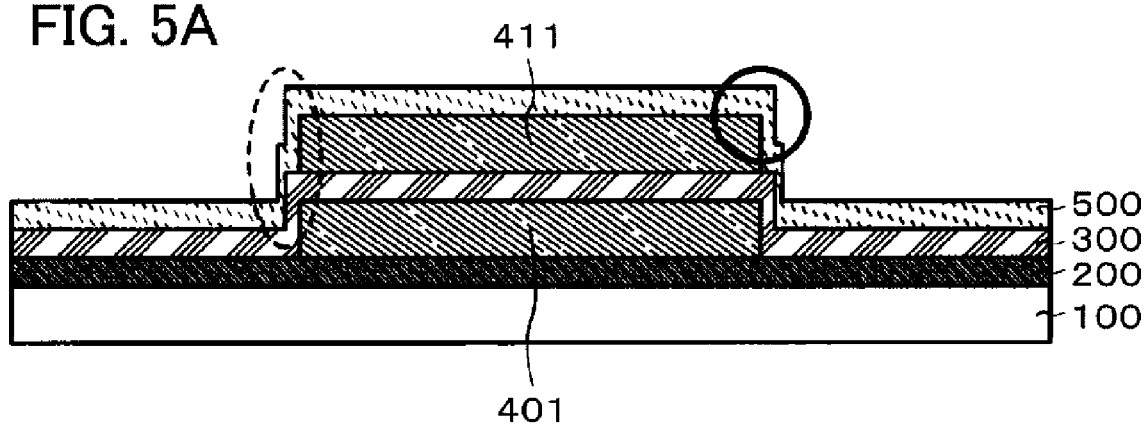
FIGS. 5A to 5C each illustrate an example of a light source.
Figure 5B:
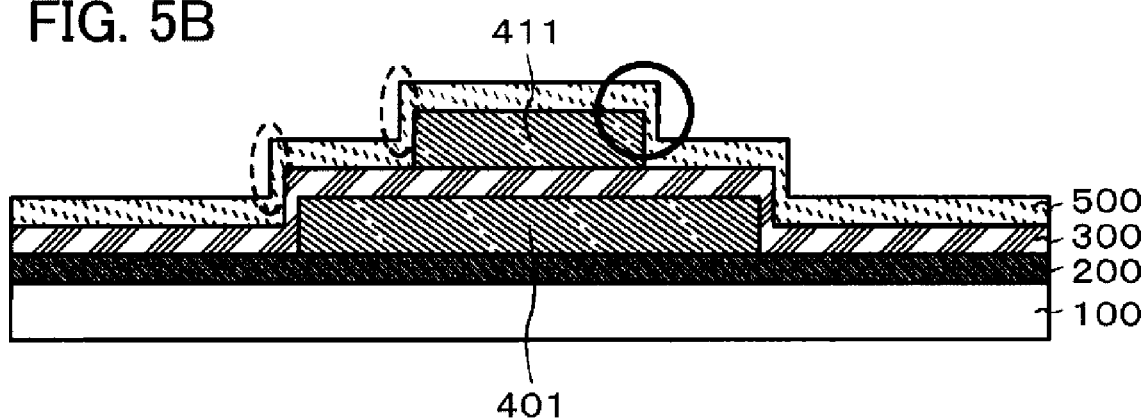
Figure 5C:
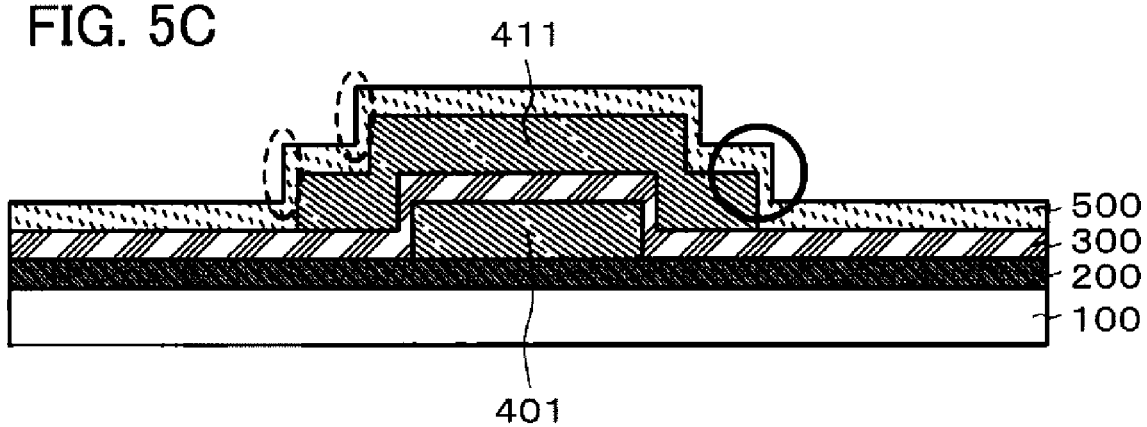

FIGS. 5A to 5C are views each illustrating one unit of a light source.

As in FIG. 5A, when the island-shaped electroluminescence layer 401 and the island-shaped electroluminescence layer 411 are made to have the same size (area (surface area)), the height of the step is high as illustrated in the drawing surrounded by a dashed ellipse; thus, breakage of the second electrode 500 easily occurs. The breakage means the state where the side surface of the predetermined layer is not covered with a film.

Therefore, as illustrated in FIGS. 5B and 5C, by making the size (area (surface area)) of the island-shaped electroluminescence layer 401 and the island-shaped electroluminescence layer 411 different from each other, step-like cross sections as surrounded by dashed ellipses are obtained; thus the height of the steps is low and the occurrence of the breakage can be reduced.

Note that when the breakage occurs in the second electrode 500 and a gap is generated in the second electrode 500, moisture enters from the gap, and deterioration of the island-shaped electroluminescence layer is easily generated, which is not preferable.

That is, it is preferable that the end portions (edge portions) of the stacked island-shaped electroluminescence layers be not overlapped with one another.

Further, electric field concentration is likely to occur at the portions of the island-shaped electroluminescence layers 411 surrounded by the circles in solid lines in FIGS. 5A to 5C because voltage is applied through top and side surfaces of the end portions.

The electroluminescence layer easily deteriorates when the electric field is concentrated.

Therefore, as in FIG. 5C, the end portions (edge portions) of the island-shaped electroluminescence layer 411 is preferably disposed outside the end portions (edge portions) of the island-shaped electroluminescence layer 401.

In an electroluminescence element in which island-shaped electroluminescence layers are stacked, the luminance is the highest at the place where island-shaped electroluminescence layers are overlapped with one another.

Thus, as in FIG. 5C, by using the region in which the island-shaped electroluminescence layers are not overlapped with one another as a sacrificial region, deterioration due to electric field concentration at the place where the island-shaped electroluminescence layers are overlapped with one another can be prevented, which is preferable.

Note that when the island-shaped electroluminescence layer 411 deteriorates due to the electric field concentration, resistance at the deteriorated place is increased; thus, current flow to the island-shaped electroluminescence layer 401 which is overlapped with the deteriorated portion is decreased.

When the current flow to the island-shaped electroluminescence layer 401 is decreased, luminance is degraded.

On the other hand, the end portions (edge portions) of the island-shaped electroluminescence layer 401 that is a lower layer are protected by the intermediate nonconductive layer 300; thus, electric field concentration is relieved.

Therefore, it is the uppermost island-shaped electroluminescence layer that is most affected by the deterioration due to the electric field concentration.

Accordingly, it is preferable to increase the size (area (surface area) of the uppermost island-shaped electroluminescence layer to be the largest. The same can be applied to the case where the number of island-shaped electroluminescence layers is three or more.

This embodiment can be combined with any other embodiment.

Embodiment 4

A method for fabricating the light source of FIG. 5B is described using FIGS. 6A and 6B, FIGS. 7A and 7B, FIGS. 8A and 8B, and FIGS. 9A and 9B.

Note that only one unit is illustrated in FIGS. 6A and 6B, FIGS. 7A and 7B, FIGS. 8A and 8B, and FIGS. 9A and 9B for simple description; however, actually, a plurality of units is formed over the same substrate as in FIGS. 1A and 1B, FIGS. 2A and 2B, FIGS. 3A and 3B, and FIGS. 4A and 4B.

Further, dashed lines A-B in cross-sectional views correspond to the dashed lines A-B in the perspective views.

Figure 6A:
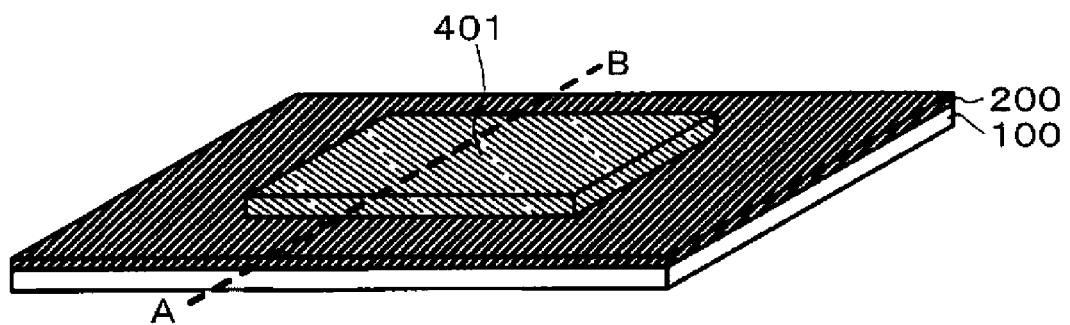
FIGS. 6A and 6B illustrate an example of a method for fabricating a light source.
Figure 6B:
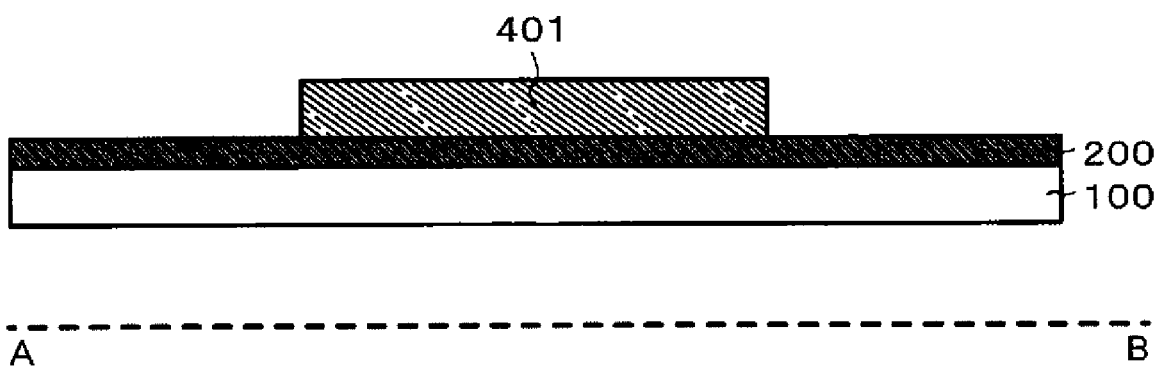

The first electrode 200 is formed over the first substrate 100, and the island-shaped electroluminescence layer 401 is formed over the first electrode 200 (FIGS. 6A and 6B).

Figure 7A:
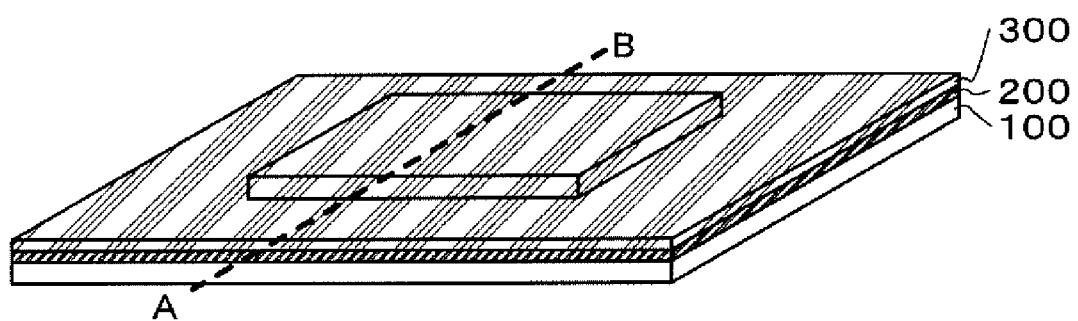
FIGS. 7A and 7B illustrate the example of the method for fabricating the light source.
Figure 7B:
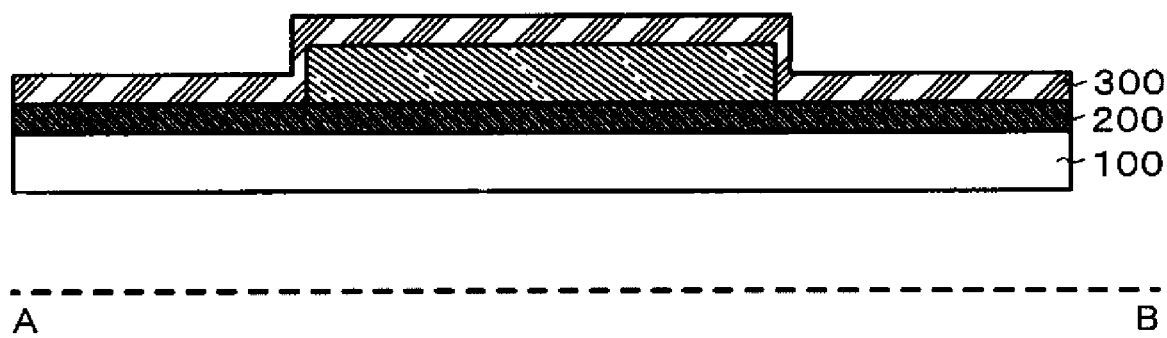

Then, the intermediate nonconductive layer 300 is formed over the island-shaped electroluminescence layer 401 and part of the first electrode 200 which is exposed (FIGS. 7A and 7B).

That is, the intermediate nonconductive layer 300 is formed so as to cover the island-shaped electroluminescence layer 401 and the first electrode 200 (FIGS. 7A and 7B).

Figure 8A:
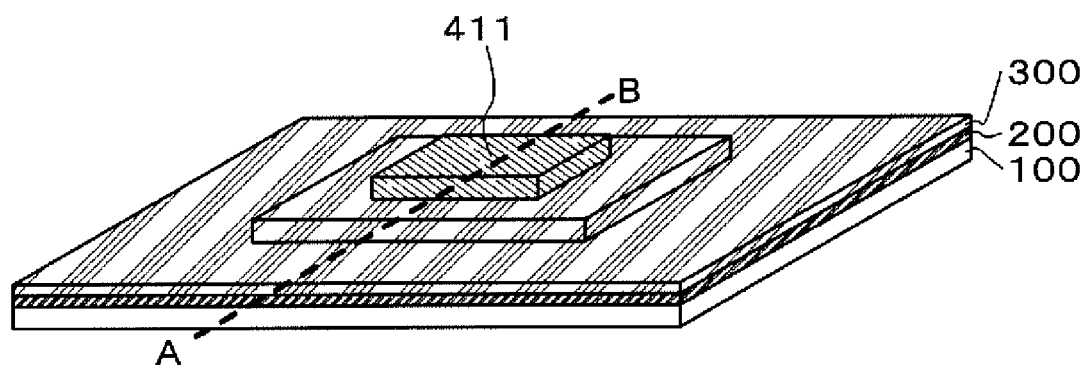
FIGS. 8A and 8B illustrate the example of the method for fabricating the light source.
Figure 8B:
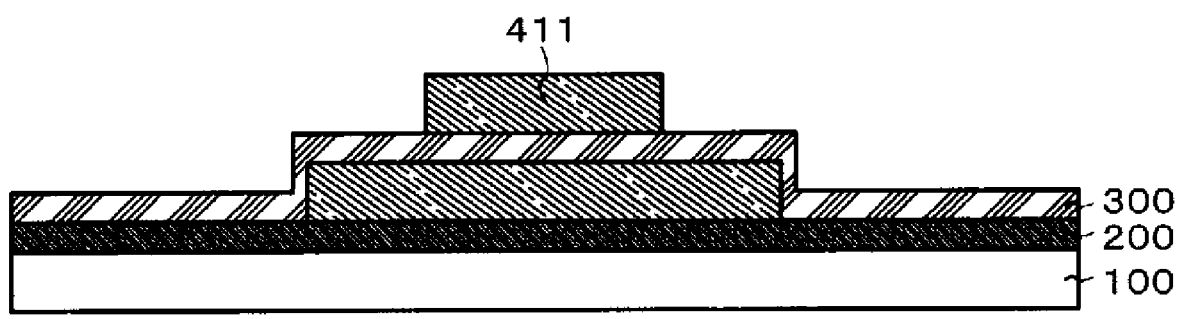

Then, the island-shaped electroluminescence layer 411 is formed over the intermediate nonconductive layer 300 (FIGS. 8A and 8B).

Figure 9A:
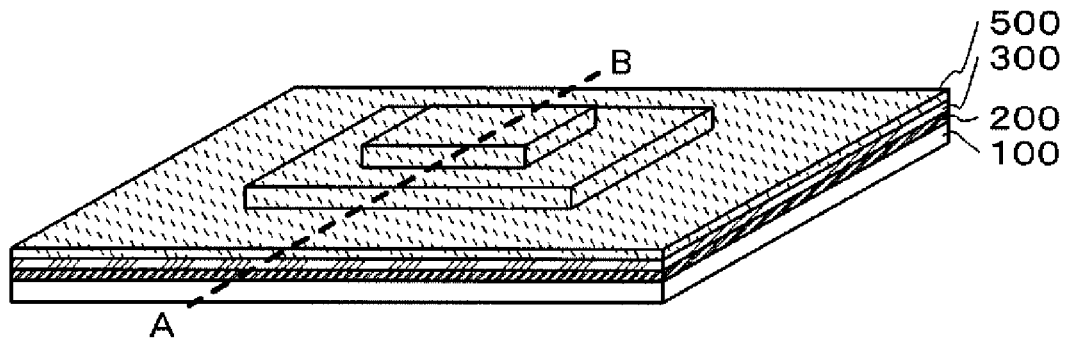
FIGS. 9A and 9B illustrate the example of the method for fabricating the light source.
Figure 9B:
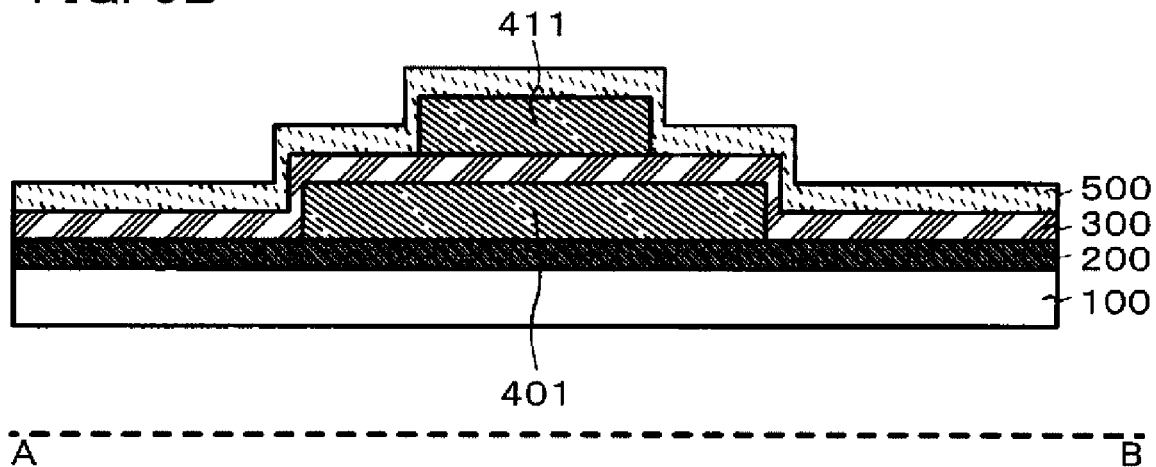

Next, the second electrode 500 is formed over the island-shaped electroluminescence layer 411 and part of the intermediate nonconductive layer 300 which is exposed (FIGS. 9A and 9B).

That is, the second electrode 500 is formed so as to cover the island-shaped electroluminescence layer 411 and the intermediate nonconductive layer 300 (FIGS. 9A and 9B).

In this embodiment, the island-shaped electroluminescence layer 411 is formed so as to be slightly smaller than the island-shaped electroluminescence layer 401.

Therefore, the peripheral end portions (all of the edge portions) of the island-shaped electroluminescence layer 411 are provided inside the peripheral end portions (all of the edge portions) of the island-shaped electroluminescence layer 401.

This embodiment can be combined with any other embodiment.

Embodiment 5

A method for fabricating the light source of FIG. 5C is described using FIGS. 10A and 10B, FIGS. 11A and 11B, FIGS. 12A and 12B, and FIGS. 13A and 13B.

Note that only one unit is illustrated in FIGS. 10A and 10B, FIGS. 11A and 11B, FIGS. 12A and 12B, and FIGS. 13A and 13B for simple description; however, actually, a plurality of units is formed over the same substrate as in FIGS. 1A and 1B, FIGS. 2A and 2B, FIGS. 3A and 3B, and FIGS. 4A and 4B.

Further, dashed lines A-B in cross-sectional views correspond to the dashed lines A-B in perspective views.

Figure 10A:
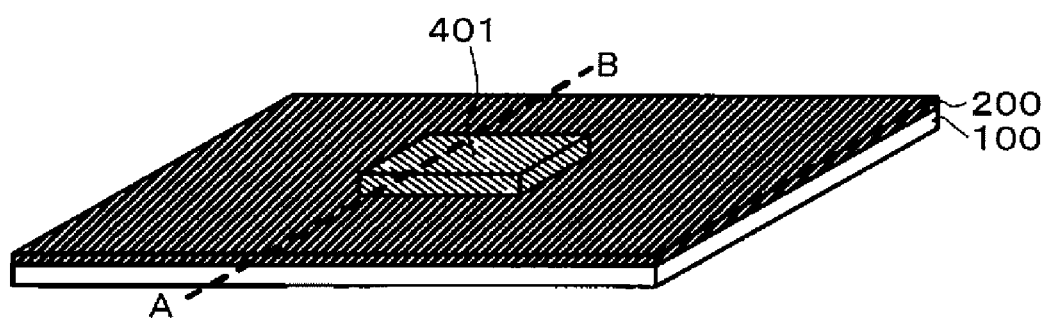
FIGS. 10A and 10B illustrate an example of a method for fabricating a light source.
Figure 10B:
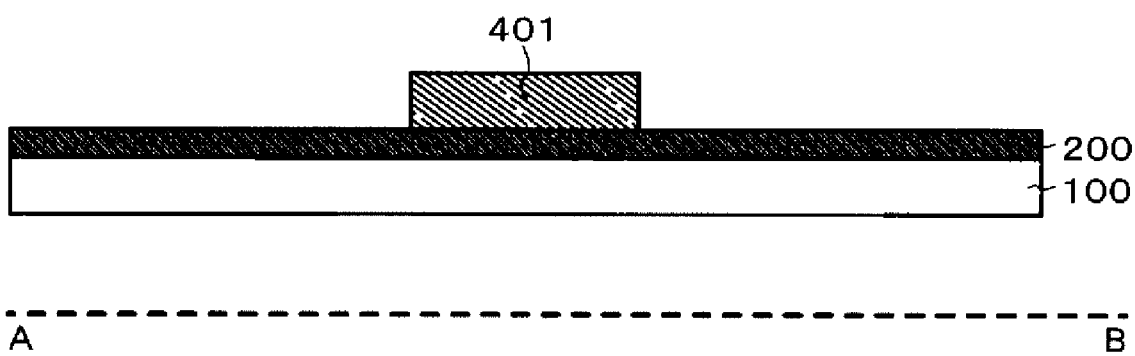

The first electrode 200 is formed over the first substrate 100, and the island-shaped electroluminescence layer 401 is formed over the first electrode 200 (FIGS. 10A and 10B).

Figure 11A:
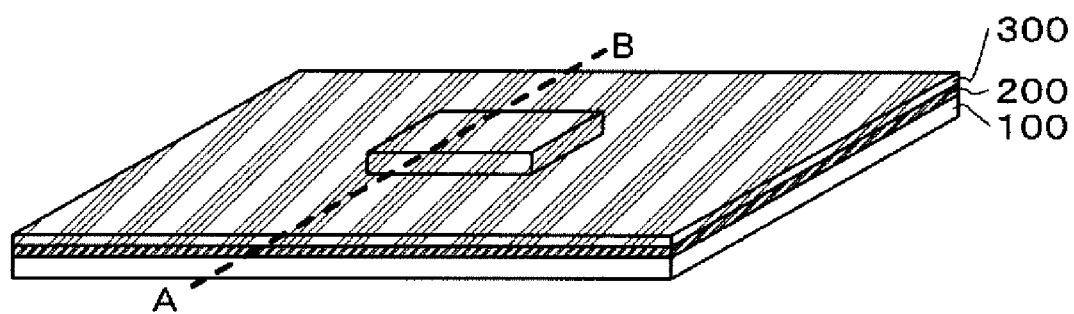
FIGS. 11A and 11B illustrate the example of the method for fabricating the light source.
Figure 11B:
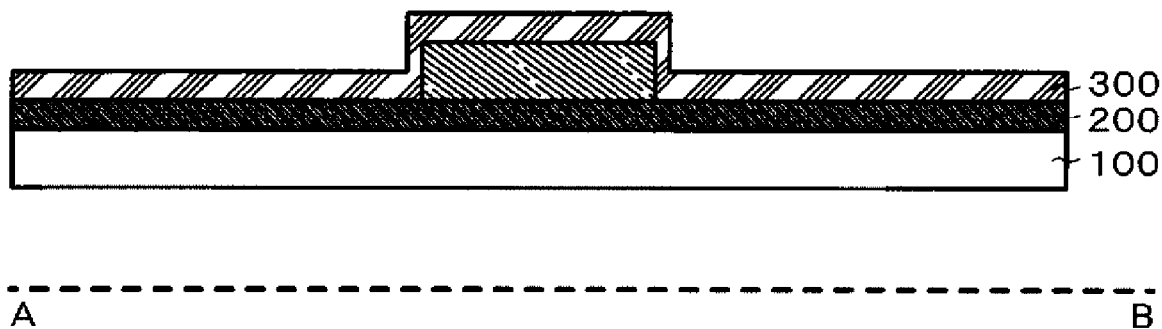

Then, the intermediate nonconductive layer 300 is formed over the island-shaped electroluminescence layer 401 and part of the first electrode 200 which is exposed (FIGS. 11A and 11B).

That is, the intermediate nonconductive layer 300 is formed so as to cover the island-shaped electroluminescence layer 401 and the first electrode 200 (FIGS. 11A and 11B).

Figure 12A:
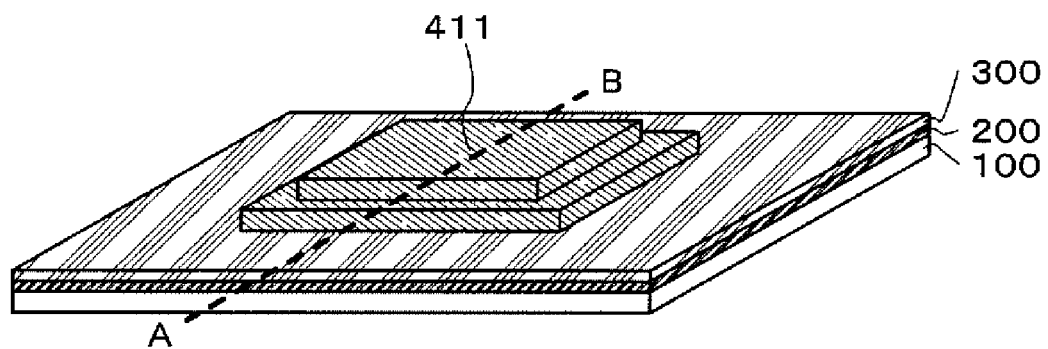
FIGS. 12A and 12B illustrate the example of the method for fabricating the light source.
Figure 12B:
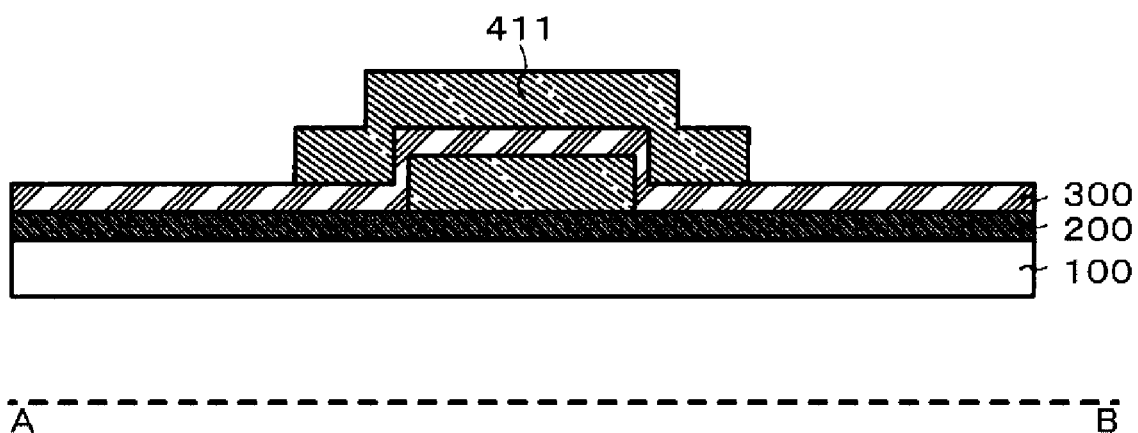

Then, the island-shaped electroluminescence layer 411 is formed over the intermediate nonconductive layer 300 (FIGS. 12A and 12B).

Figure 13A:
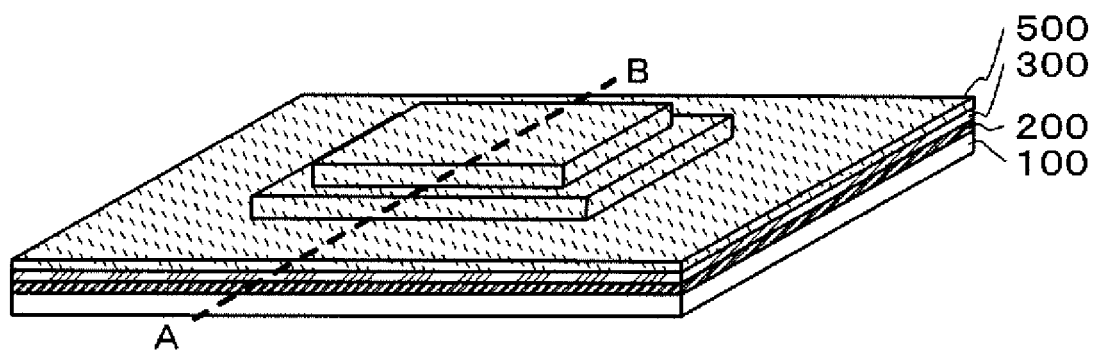
FIGS. 13A and 13B illustrate an example of a method for fabricating a light source.
Figure 13B:
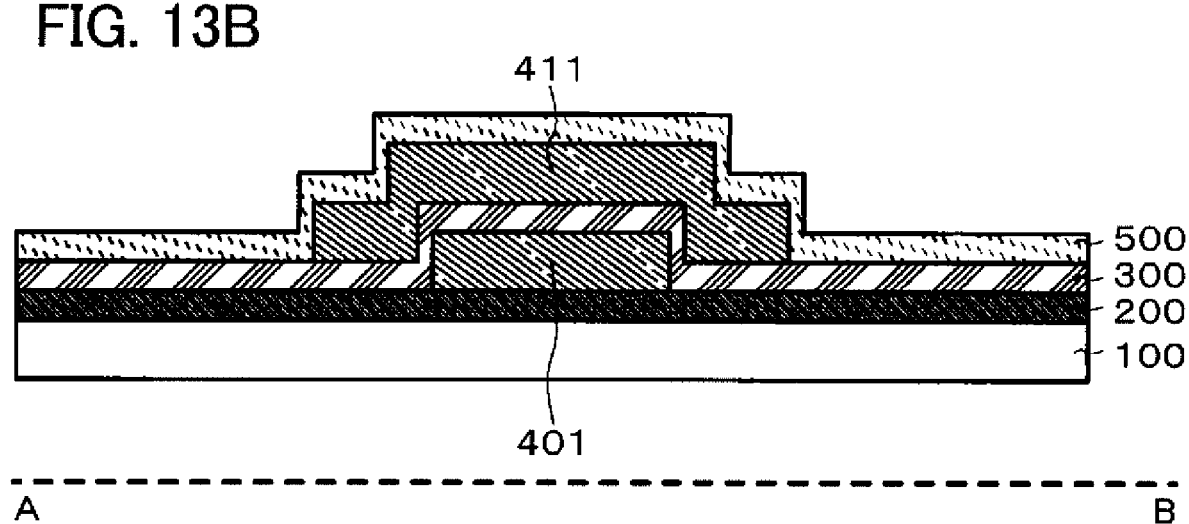

Next, the second electrode 500 is formed over the island-shaped electroluminescence layer 411 and part of the intermediate nonconductive layer 300 which is exposed (FIGS. 13A and 13B).

That is, the second electrode 500 is formed so as to cover the island-shaped electroluminescence layer 411 and the intermediate nonconductive layer 300 (FIGS. 13A and 13B).

In this embodiment, the island-shaped electroluminescence layer 411 is formed so as to be slightly larger than the island-shaped electroluminescence layer 401.

Therefore, the peripheral end portions (all of the edge portions) of the island-shaped electroluminescence layer 411 are provided outside the peripheral end portions (all of the edge portions) of the island-shaped electroluminescence layer 401.

This embodiment can be combined with any other embodiment.

Embodiment 6

In FIGS. 1A and 1B, FIGS. 2A and 2B, FIGS. 3A and 3B, FIGS. 4A and 4B, FIGS. 5A to 5C, FIGS. 6A and 6B, FIGS. 7A and 7B, FIGS. 8A and 8B, FIGS. 9A and 9B, FIGS. 10A and 10B, FIGS. 11A and 11B, FIGS. 12A and 12B, and FIGS. 13A and 13B, the number of stacked island-shaped electroluminescence layers is two; however, the number of stacked island-shaped electroluminescence layers may be two or more (FIGS. 14A and 14B, and FIGS. 15A and 15B).

In FIGS. 14A and 14B, and FIGS. 15A and 15B, in order to describe an example of the island-shape electroluminescence layers having three layers, an intermediate nonconductive layer 310 and an island-shaped electroluminescence layer 421 are added.

It is needless to say that the number of stacked layers may be four or more.

Figure 14A:
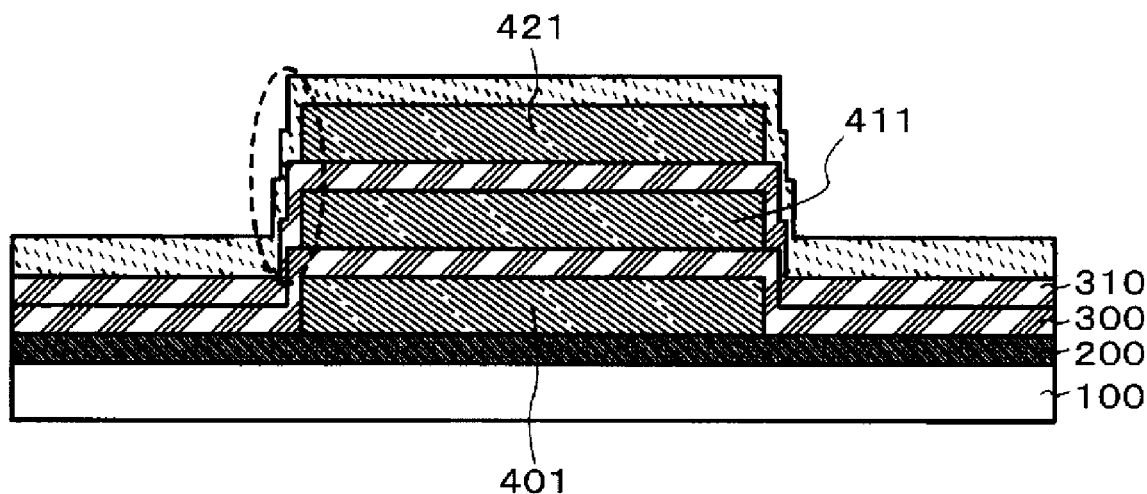
FIGS. 14A and 14B each illustrate an example of a light source.

In addition, as surrounded by a dashed ellipse in FIG. 14A, when the end portions of the island-shaped electroluminescence layers are overlapped with one another, occurrence of breakage is increased as the number of stacked layers is increased.

Figure 14B:
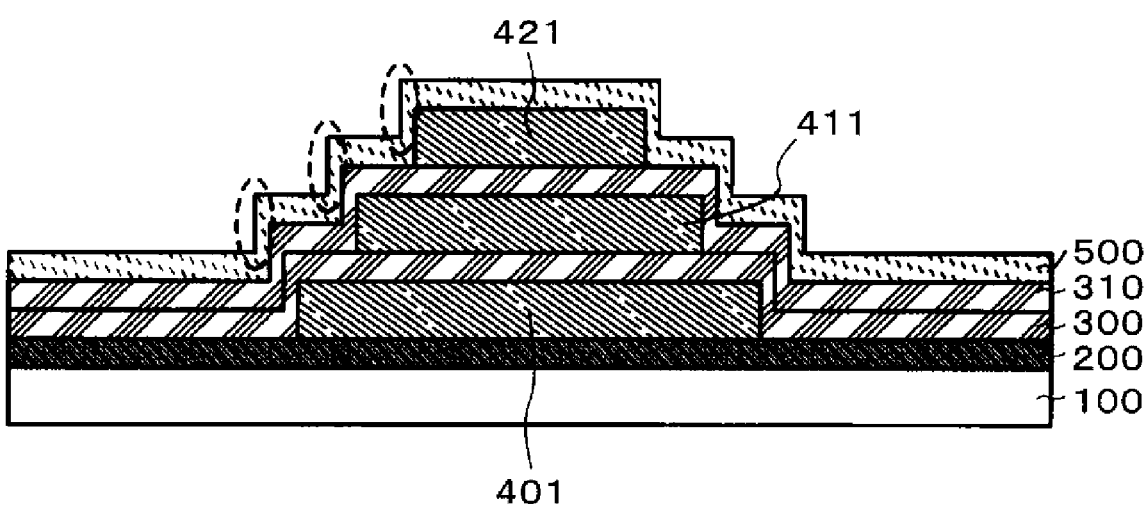

Therefore, as in FIG. 14B, the occurrence of breakage can be reduced by making the upper layer of the island-shaped electroluminescence layers slightly smaller than that of the lower layer (see dashed ellipse).

Figure 15A:
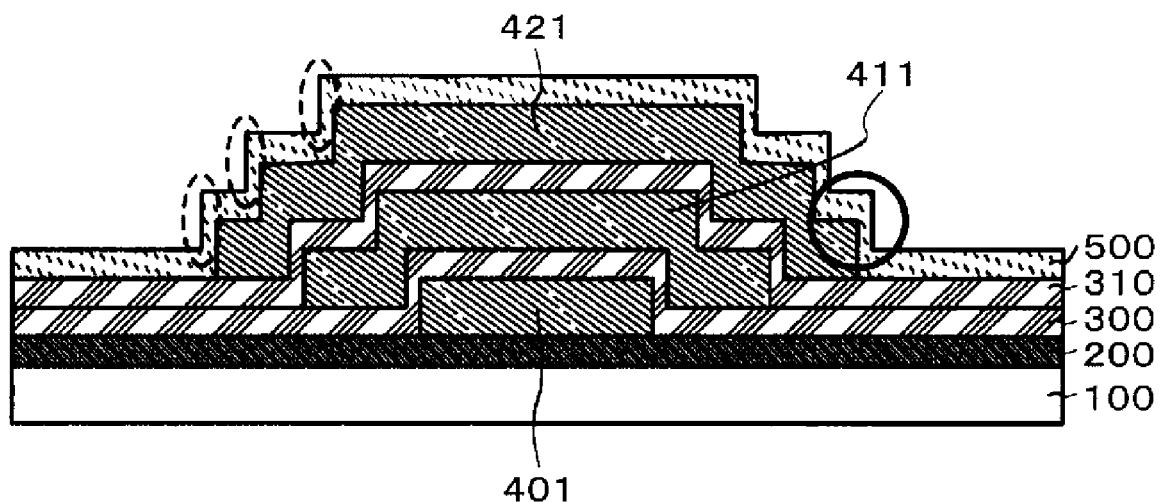
FIGS. 15A and 15B each illustrate an example of a light source.

Alternatively, as in FIG. 15A, by making the upper layer of the island-shaped electroluminescence layers slightly larger than that of the lower layer, the occurrence of breakage can be reduced (see dashed ellipse).

Figure 15B:
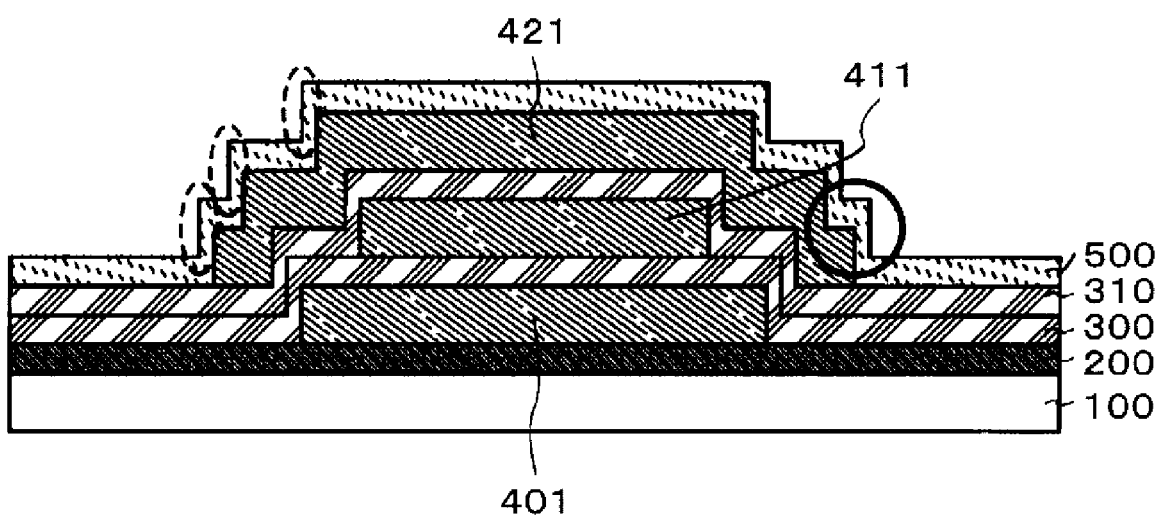

Alternatively, as in FIG. 15B, the island-shaped electroluminescence layer which is centrally-positioned may be made the smallest so that the occurrence of breakage would be reduced (see dashed ellipse).

That is, if at least one of the island-shaped electroluminescence layers has a different size (area, (surface area)), the occurrence of breakage can be reduced.

However, in the case where each island-shaped electroluminescence layer has different size (area (surface area)), the largest effect can be obtained.

That is, it is preferable that end portions (edge portions) of each island-shaped electroluminescence layer be not overlapped with one another.

Further, as is surrounded by circles in solid lines in FIGS. 15A and 15B, by making the uppermost island-shaped electroluminescence layer the largest; the region outside the uppermost island-shaped electroluminescence layer can be used as a sacrificial region.

It is preferable that deterioration due to electric field concentration at the region where the island-shaped electroluminescence layers be overlapped with one another can be prevented by providing the sacrificial region.

Note that in this embodiment, both of the intermediate nonconductive layer 300 and the intermediate nonconductive layer 310 are used as short-circuit preventing layers which prevent a short circuit between the first electrode 200 and the second electrode 500.

Only one of the intermediate nonconductive layer 300 and the intermediate nonconductive layer 310 may be used as the short-circuit preventing layer.

That is, the other one of the intermediate nonconductive layer 300 and the intermediate nonconductive layer 310 may have an island shape.

In other words, in the case where there is a plurality of intermediate nonconductive layers, at least one intermediate nonconductive layer may be the short-circuit preventing layer.

However, it can be said that it is preferable to use all of the plurality of intermediate nonconductive layers as the short-circuit preventing layers in terms of increase in resistance and prevention of breakage.

This embodiment can be combined with any other embodiment.

Embodiment 7

Figure 16A:
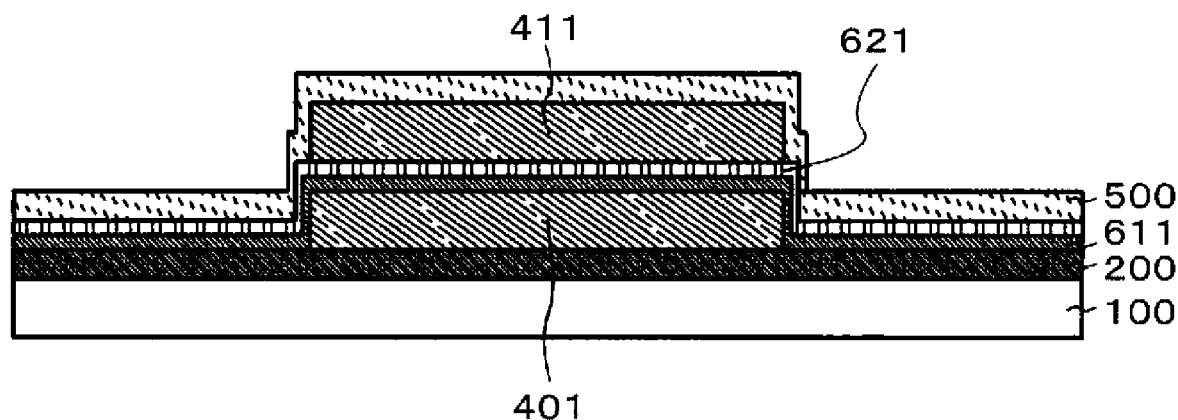
FIGS. 16A and 16B each illustrate an example of a light source.

FIG. 16A is an example of an intermediate nonconductive layer having a stack structure of a transition metal oxide layer 611 and an organic compound layer 621.

In this case, a charge-transfer complex is formed at an interface between the transition metal oxide layer 611 and the organic compound layer 621.

In the case where the organic compound layer 621 is formed of a material having a hole-transport property (for example, arylamine compound, or the like), the organic compound layer 621 may be used as part of the intermediate nonconductive layer and the part of the island-shaped electroluminescence layer 411.

Figure 16B:
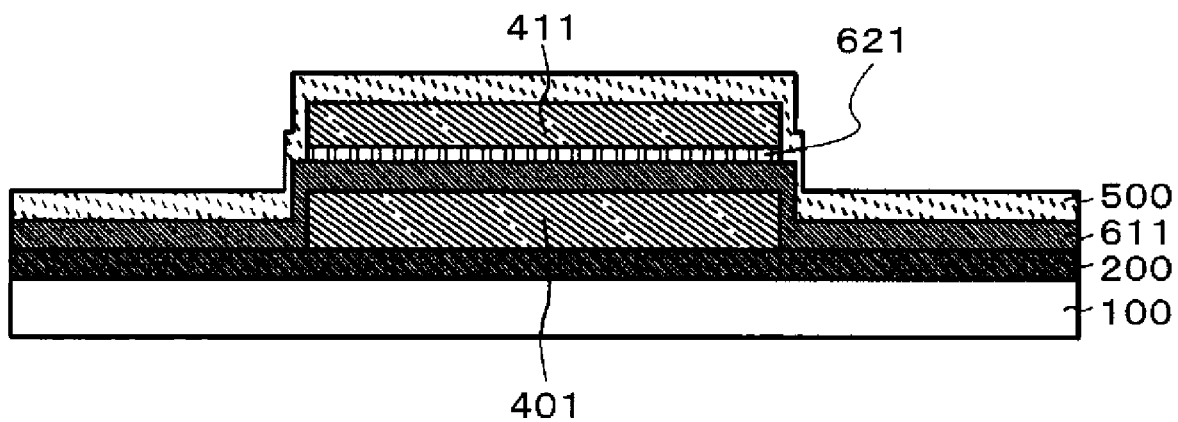

Note that as in FIG. 16B, it is preferable that the organic compound layer 621 have an island shape because moisture does not penetrate into the organic compound layer 621 that is likely to allow moisture to penetrate therethrough. The transition metal oxide rarely allows moisture to penetrate therethrough.

This embodiment can be combined with any other embodiment.

Embodiment 8

A structure of power supply in the light source is described.

Figure 17A:
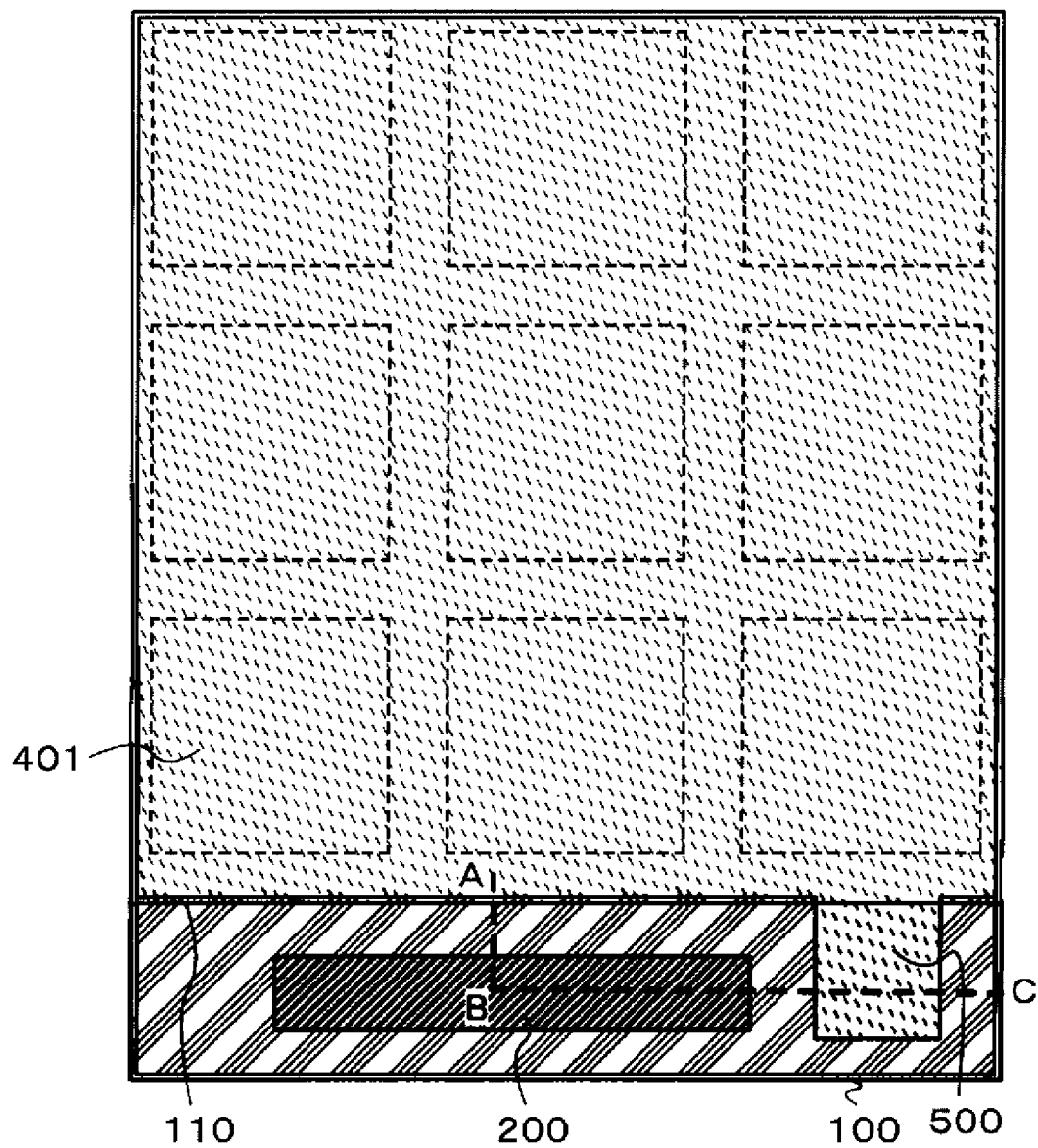
FIGS. 17A and 17B illustrate an example of a light source.
Figure 17B:
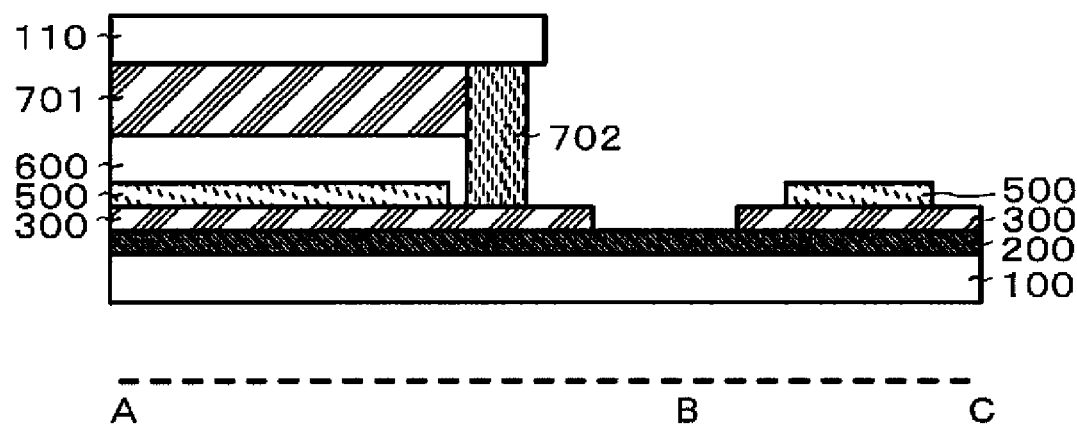

FIGS. 17A and 17B illustrate an example of the structure of the power supply in the light source.

The dashed line A-B-C of FIG. 17A corresponds to the dashed line A-B-C of FIG. 17B.

In a light-emitting region where the island-shaped electroluminescence layer is formed, a first sealant 701 fills a region surrounded by the second substrate 110 and a second sealant 702 disposed in the periphery of the light-emitting region.

Note that a protective film 600 is also provided.

In a connection portion, an opening portion is provided in part of the intermediate nonconductive layer 300, and the first electrode 200 is exposed in the opening portion.

Further, the second electrode 500 is provided to extend to the connection portion.

Thus, the first and second electrodes are exposed in the connection portion, whereby the power supply can be realized.

This embodiment can be combined with any other embodiment.

Embodiment 9

A structure of the power supply in the light source is described.

FIGS. 18A and 18B and FIGS. 19A and 19B illustrate examples of the structure of the power supply.

Figure 18A:
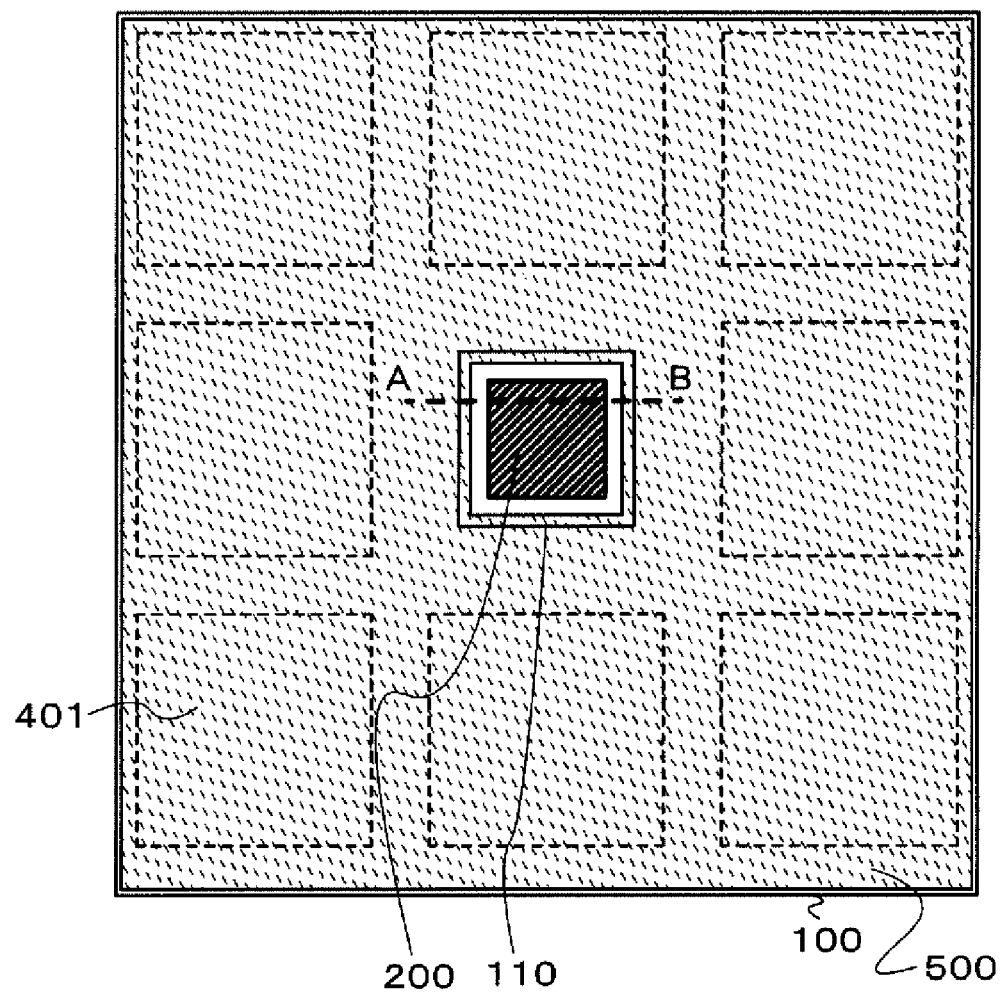
FIGS. 18A and 18B illustrate an example of a light source.
Figure 18B:
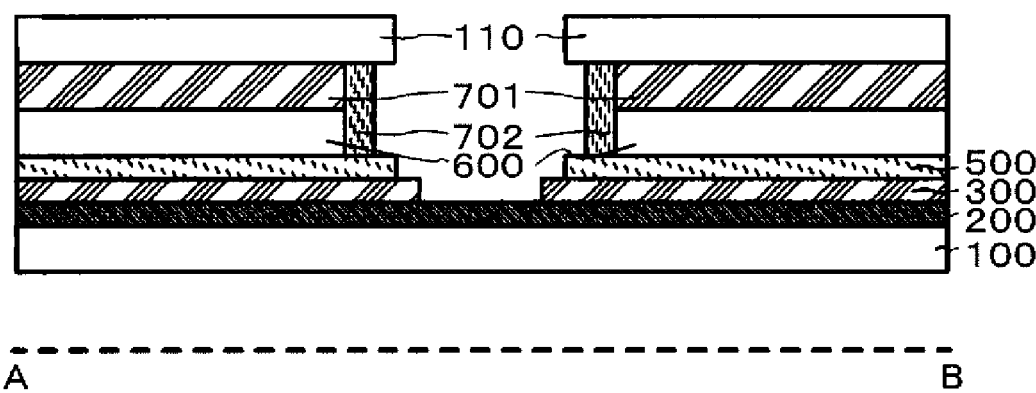

The dashed line A-B of FIG. 18A corresponds to the dashed line A-B of FIG. 18B.

Figure 19A:
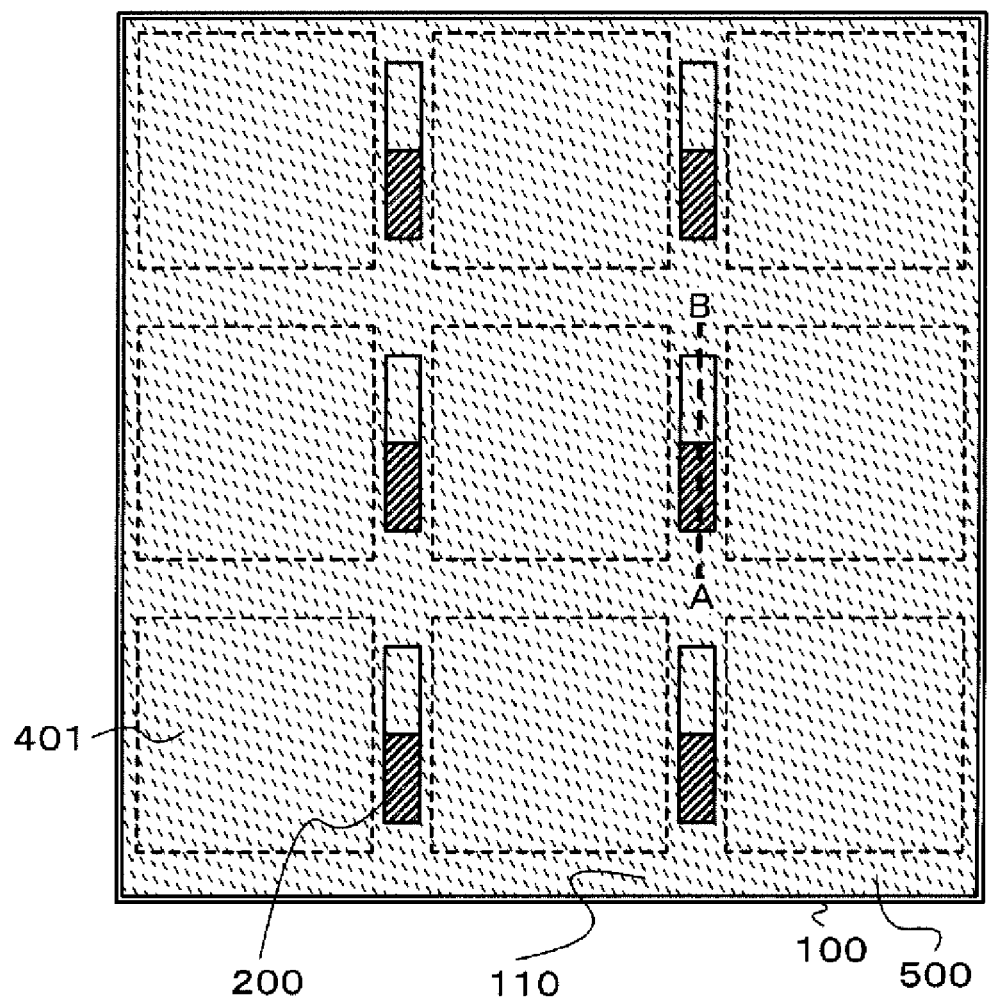
FIGS. 19A and 19B illustrate an example of a light source.
Figure 19B:
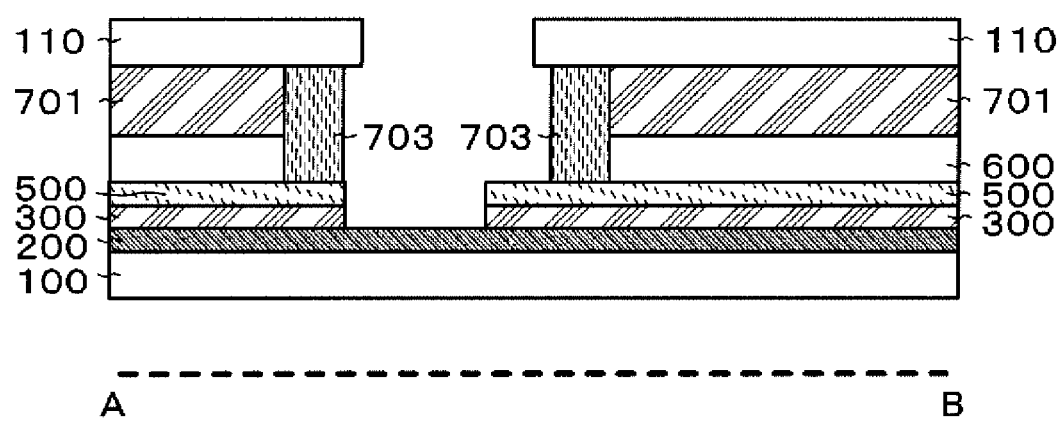

The dashed line A-B of FIG. 19A corresponds to the dashed line A-B of FIG. 19B.

In FIGS. 18A and 18B, a connection portion is disposed so as to be surrounded by the light-emitting regions.

Thus, an opening portion is provided in the second substrate 110 in FIGS. 18A and 18B.

In the connection portion, the first and second electrodes are exposed.

In FIGS. 19A and 19B, each of the plurality of connection portions is disposed so as to be surrounded by the light-emitting regions.

Thus, a plurality of opening portions is provided in the second substrate 110 in FIGS. 19A and 19B.

In the light-emitting region where the island-shaped electroluminescence layer is formed, the first sealant 701 fills a region surrounded by the second substrate 110 and the second sealant 702 disposed in the periphery of the light-emitting region in FIGS. 18A and 18B, while the first sealant 701 fills a region surrounded by the second substrate 110 and a third sealant 703 disposed in the periphery of the light-emitting region in FIGS. 19A and 19B.

Note that the protective film 600 is also provided.

The arrangement in which the connection portion is surrounded by the light-emitting regions allows a reduction in the area of the first substrate 100.

Providing the connection portions between the island-shaped electroluminescence layers as in FIGS. 19A and 19B realizes an increase in the area of the light-emitting region.

This embodiment can be combined with any other embodiment.

Embodiment 10

Figure 20A:
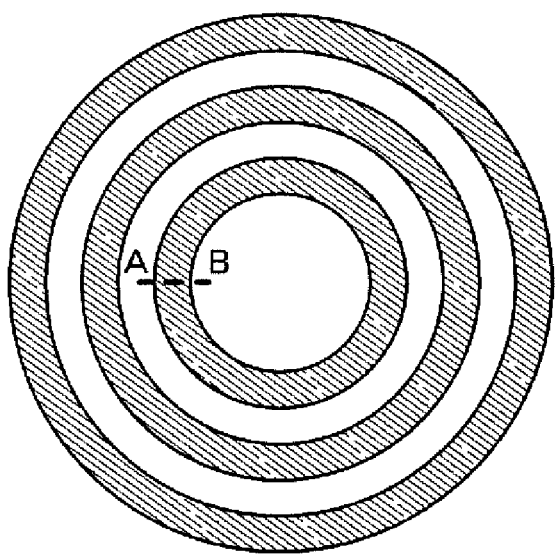
FIGS. 20A to 20C illustrates examples of a light source.

As illustrated in FIG. 20A, the island-shaped electroluminescence layers may each have the shape of a ring (e.g., a circular ring or a polygonal ring).

Figure 20B:
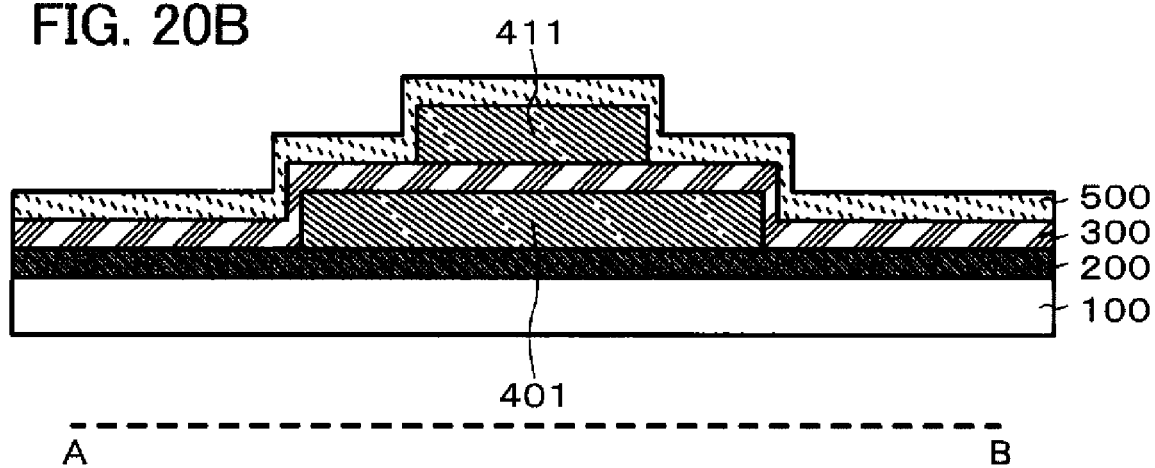
Figure 20C:
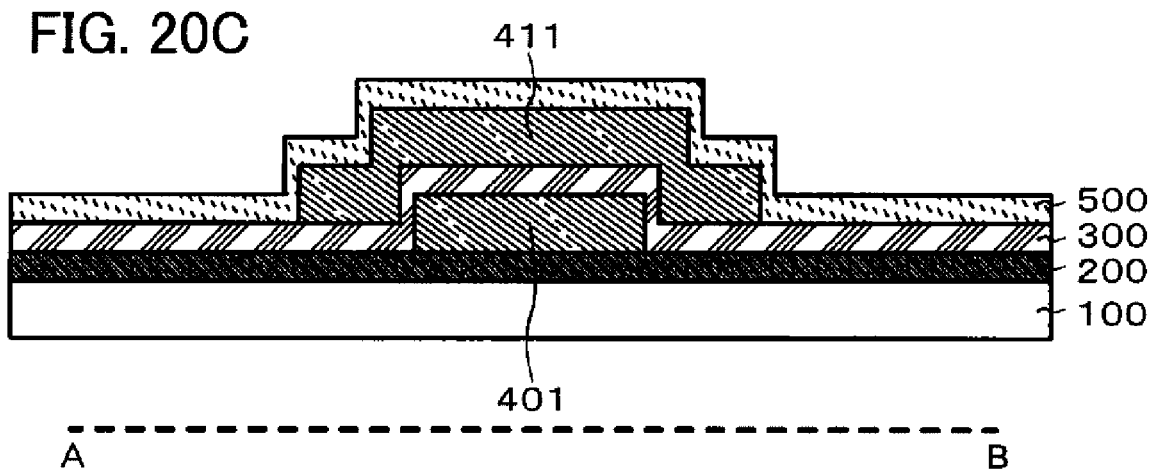

The dashed line A-B of FIG. 20A corresponds to the dashed lines A-B of FIGS. 20B and 20C.

FIG. 20B illustrates the case where the island-shaped electroluminescence layers each have the shape of a ring (e.g., a circular ring or a polygonal ring) in which the island-shaped electroluminescence layer 411 is made slightly smaller than the island-shaped electroluminescence layer 401.

That is, one of end portions of the island-shaped electroluminescence layer 411 is provided inside one of end portions of the island-shaped electroluminescence layer 401.

Further, the other one of the end portions of the island-shaped electroluminescence layer 411 is provided inside the other one of the end portions of the island-shaped electroluminescence layer 401.

In other words, both of the end portions of the island-shaped electroluminescence layer 411 are provided inside both of the end portions of the island-shaped electroluminescence layer 401.

FIG. 20C illustrates the case where the island-shaped electroluminescence layers each have the shape of a ring (e.g., a circular ring or a polygonal ring) in which the island-shaped electroluminescence layer 411 is made slightly larger than the island-shaped electroluminescence layer 401.

That is, one of the end portions of the island-shaped electroluminescence layer 411 is provided outside the one of the end portions of the island-shaped electroluminescence layer 401.

Further, the other one of the end portions of the island-shaped electroluminescence layer 411 is provided outside the other one of the end portions of the island-shaped electroluminescence layer 401.

In other words, both of the end portions of the island-shaped electroluminescence layer 411 are provided outside both of the end portions of the island-shaped electroluminescence layer 401.

With the structure illustrated in FIGS. 20B and 20C, the possibility that the breakage of the second electrode 500 occurs can be reduced even in the case where the island-shaped electroluminescence layers each have the shape of a ring.

Furthermore, with the structure of FIG. 20C, a sacrificial region can be formed even in the case where the island-shaped electroluminescence layers each have the shape of a ring.

Note that the number of stacked island-shaped electroluminescence layers may be three or more.

This embodiment can be combined with any other embodiment.

Embodiment 11

The way to provide a connection portion when the island-shaped electroluminescence layers each have the shape of a ring is described.

Figure 21A:
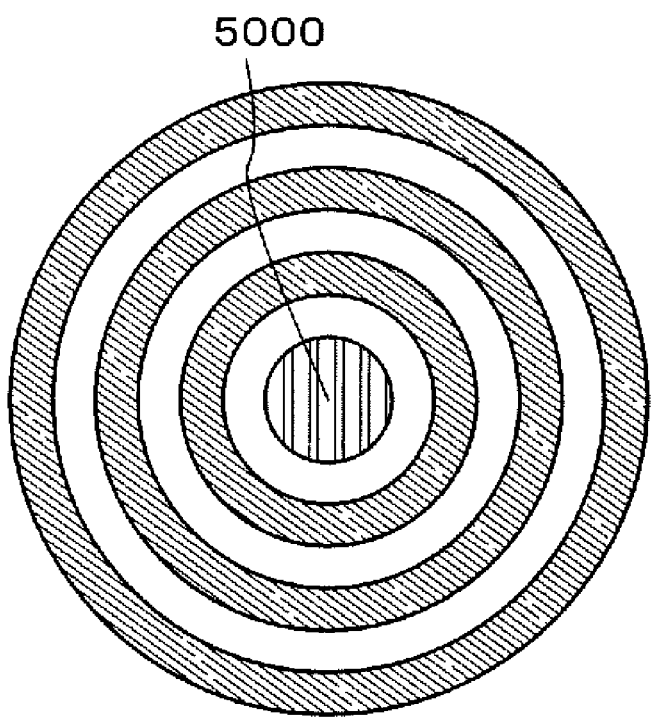
FIGS. 21A and 21B each illustrate an example of a light source.

In FIG. 21A, a connection portion 5000 is provided in a space of the center.

Figure 21B:
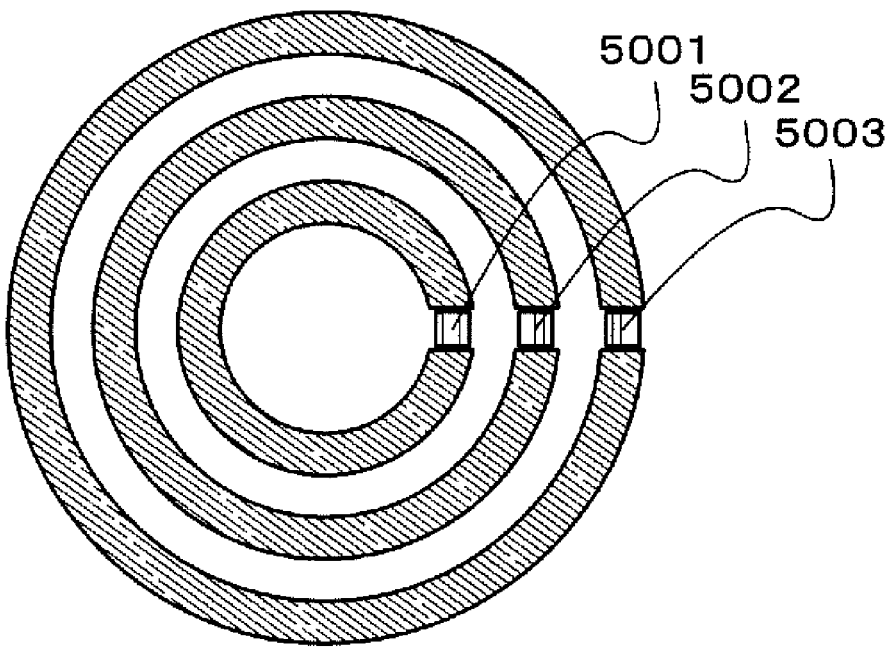

In FIG. 21B, notch portions are formed in the island-shape electroluminescence layers each having the shape of a ring, and connection portions 5001, 5002, and 5003 are provided inside the notch portions.

As described in other embodiments, the connection portions can be formed so as to expose the first electrode and the second electrode.

This embodiment can be combined with any other embodiment.

Embodiment 13

Providing the plurality of island-shaped electroluminescence layers allows the light source to be shaped as desired.

Because the electroluminescence layer has been formed over the entire surface in a conventional light source, cutting the light source results in exposure of a side surface of the electroluminescence layer.

The exposure of the side surface of the electroluminescence layer causes deterioration of the whole electroluminescence layer, making it impossible to function as a light source.

This problem can be solved by the formation of the plurality of island-shaped electroluminescence layers.

Figure 25A:
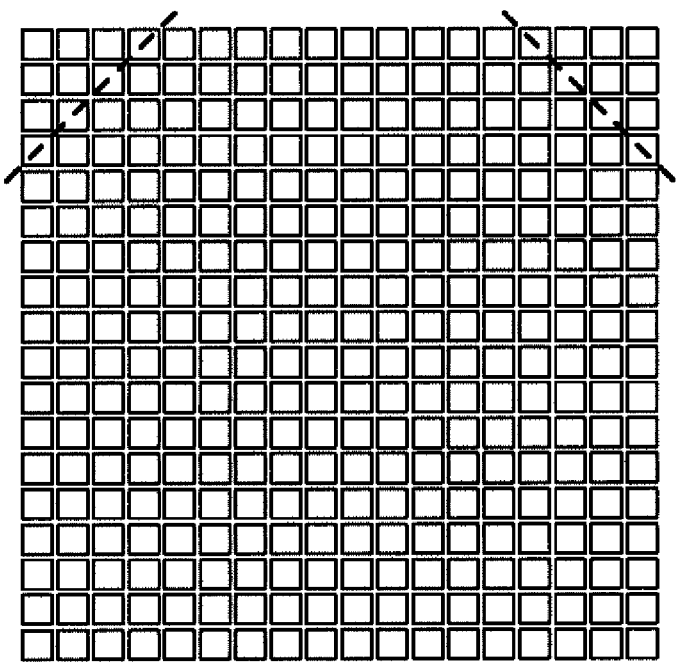
FIGS. 25A and 25B illustrate cutting of a light source.

FIG. 25A is the light source before a cutting process.

Figure 25B:
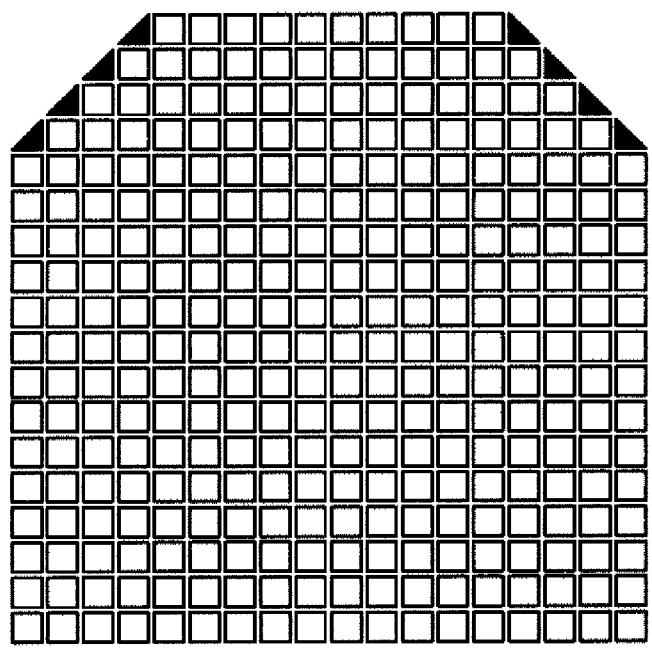
Figure 26:
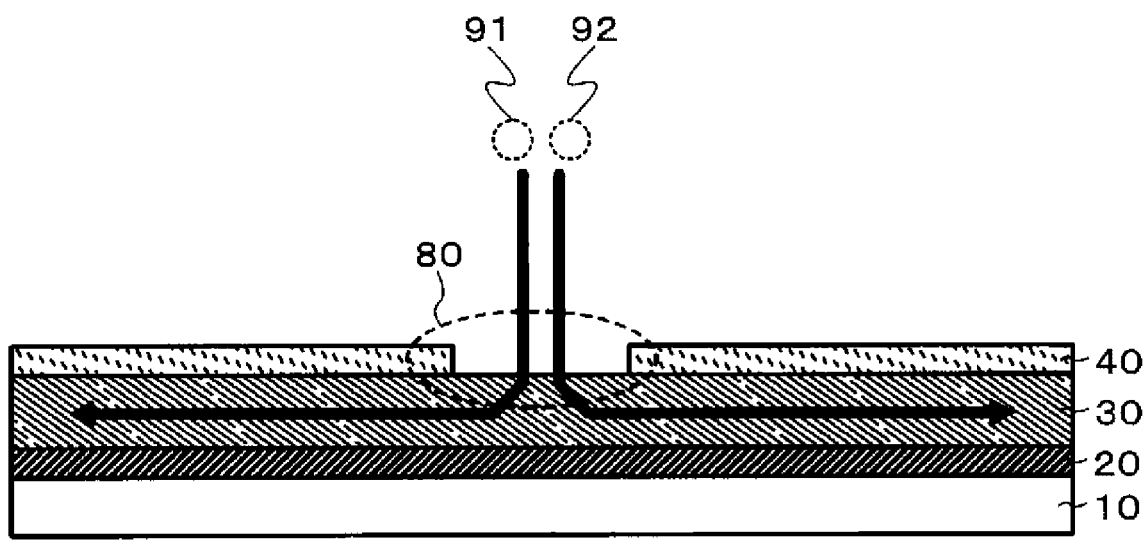
FIG. 26 illustrates an example of a conventional technique.

FIG. 25B is the light source after the cutting process.

In FIGS. 25A and 25B, white island-shaped portions represent the island-shaped electroluminescence layers having unexposed side surfaces, black island-shaped portions represent the island-shaped electroluminescence layers having exposed side surfaces, and the dashed lines represent cut portions.

As apparent from FIGS. 25A and 25B, the island-shaped electroluminescence layers formed at the cut portions stop exhibiting light emission because of the exposure of the side surfaces, while the island-shaped electroluminescence layers formed at a place other than the cut portions continue exhibiting light emission because the side surfaces are not exposed.

In this manner, it is possible to provide the light source capable of being shaped as desired.

When the first substrate or the second substrate is a rigid substrate such as a glass substrate or a quartz substrate, laser cutting, a dicing apparatus, or the like may preferably be used in the cutting process.

In contrast, when the substrate itself is soft as in a flexible light source, the cutting process can be easily carried out with a simple cutting tool, such as scissors or a cutter; thus, anyone can enjoy shaping the light source at school, home, etc.

The cutting process is preferably carried out so that the connection portion remains after the cutting process.

When the connection portion is surrounded by the light-emitting regions as in FIGS. 18A and 18B, and FIG. 21A, there is no limitation on the resulting shape after the cutting process because the cutting process is carried out so that the connection portion remains.

Further, the structure in which the plurality of connection portions is provided as in FIGS. 19A and 19B, and FIG. 21B is very preferable because this structure eliminates the need for attention to the positions of the connection portions during the cutting process.

If only one connection portion is provided, a cut piece in which no connection portion remains goes to waste. In contrast, when the plurality of connection portions is provided, even the cut piece can exhibit light emission and be used again as a light source.

Figure 22A:
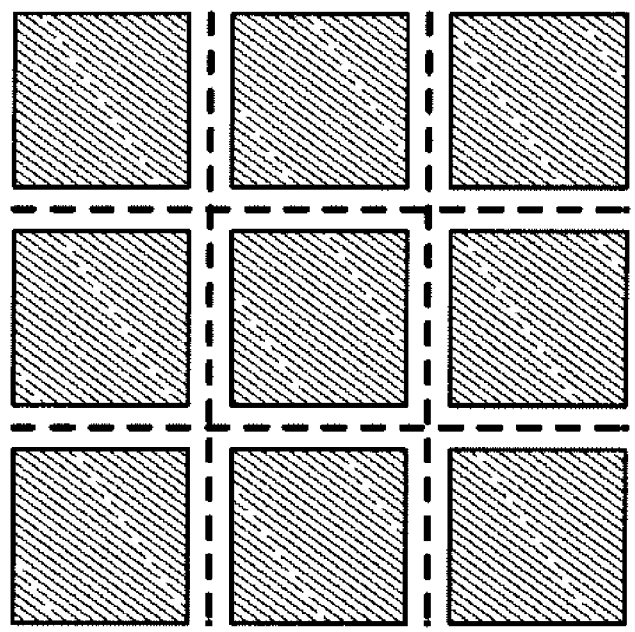
FIGS. 22A and 22B each illustrate an example of a light source.
Figure 22B:
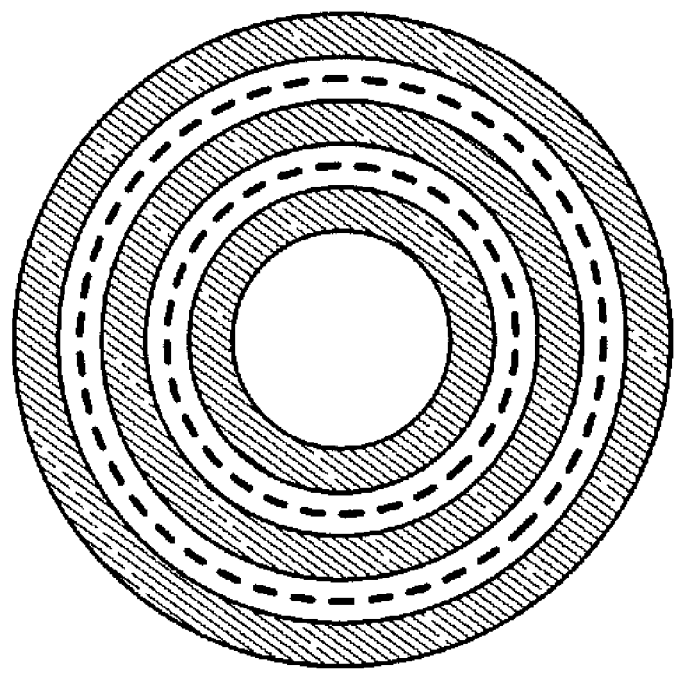

By providing cutting holes forming a dashed line (perforations) as illustrated in FIGS. 22A and 22B, the cutting process does not require use of a cutting tool and can be easily carried out at home, school etc.

It is preferable that the cutting holes forming a dashed line (perforations) be precisely formed by using laser cutting or the like.

The cutting holes forming a dashed line (perforations) are formed so as to be pierced through the first substrate, the second substrate, the sealant, the first electrode, the second electrode, the nonconductive layer, the protective film, and the like.

This embodiment can be combined with any other embodiment.

Embodiment 14

Figure 23:
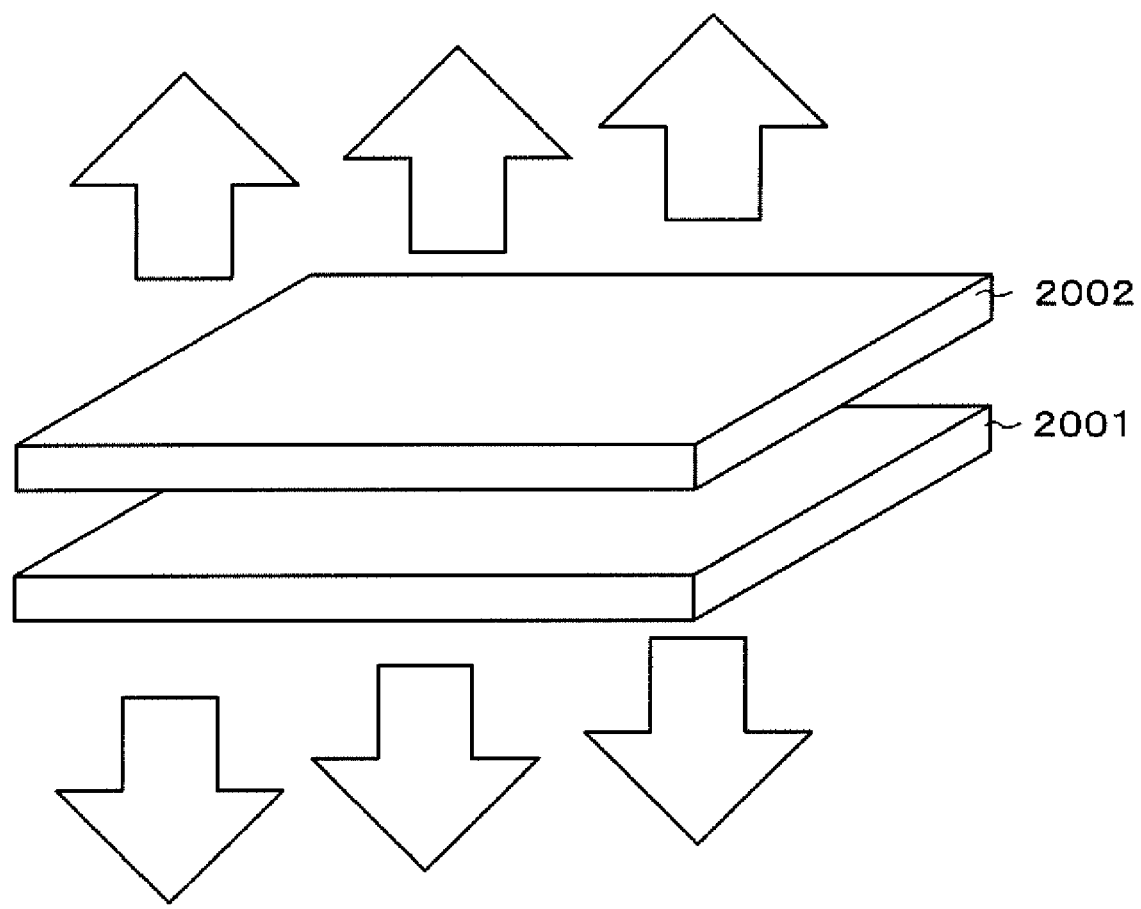
FIG. 23 illustrates an example of a device having a light source.

FIG. 23 illustrates a device in which a light guide plate 2002 is disposed to face a dual-emission light source 2001.

Since the electroluminescence layers are divided into island-shaped layers, the dual-emission light source 2001 does not exhibit uniform light emission.

Therefore, uniform light emission is obtained by providing the light guide plate 2002.

In addition, non-uniform light emission is also exhibited from a side where the light guide plate 2002 is not disposed.

Thus, by arranging the island-shaped electroluminescence layers so as to form a mark, it is possible to provide a practical and fashionable device (or a light-emitting panel) in which uniform light emission is exhibited from one side while the illuminated mark is exhibited from the other side. When the purpose is to obtain uniform light emission, the light source may be of a one-side emission type. In the one-side emission type, the light guide plate is provided on a side of the one-side emission light source where light is emitted.

Figure 24:
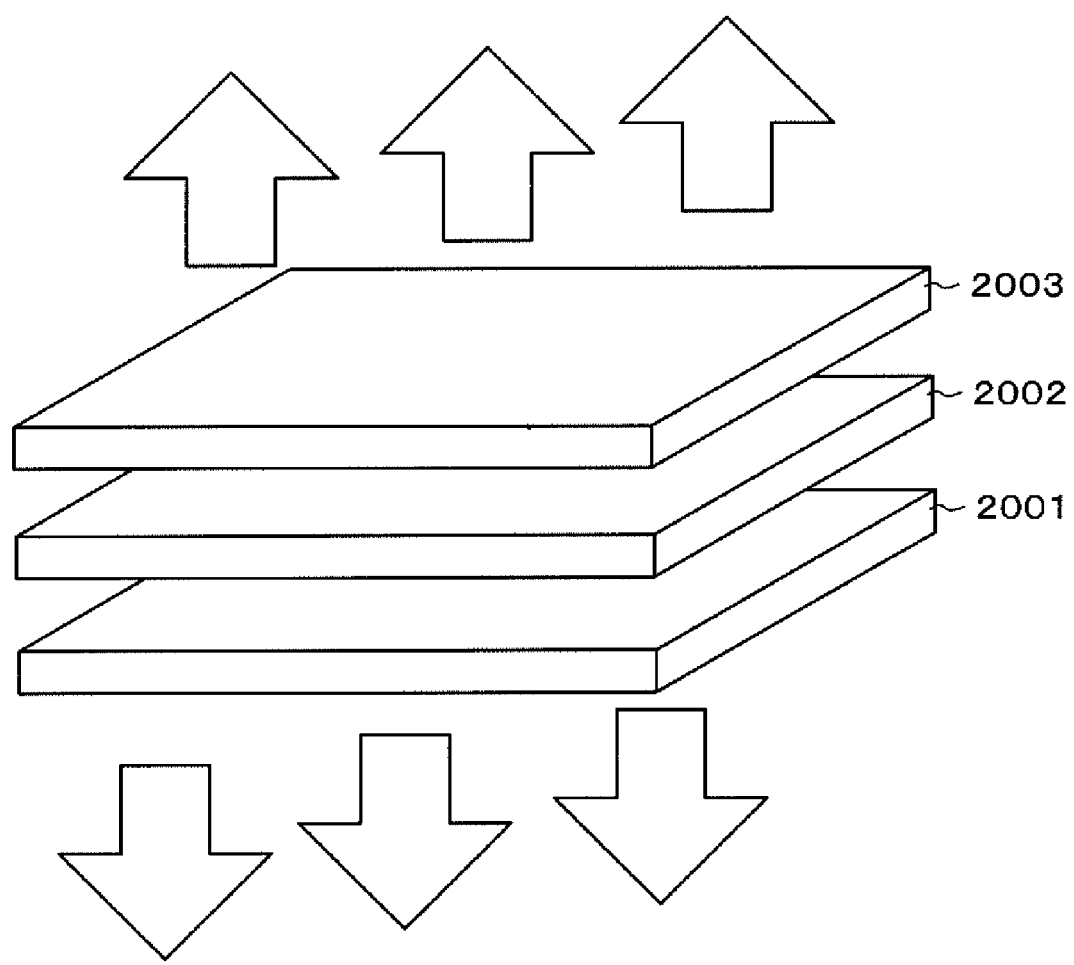
FIG. 24 illustrates an example of a device having a light source.

With the structure in which the light guide plate 2002 is interposed between the dual-emission light source 2001 and a display panel 2003 as illustrated in FIG. 24, it is possible to provide a device (or a display device) in which display can be enjoyed on one side while the mark is illuminated on the other side, for instance. When the purpose is to obtain uniform light emission, the light source may be of one-side emission type. In the one-side emission type, the light guide plate is provided on a side of the one-side emission light source where light is emitted.

Examples of the display panel include, but not limited to, a liquid crystal display panel, an electrophoretic display panel using a microcapsule, an organic electroluminescence display panel, an inorganic electroluminescence display panel, and the like.

The liquid crystal display panel, the electrophoretic display, and the like are display panels using an optical modulation system.

The organic electroluminescence display panel, the inorganic electroluminescence display panel, and the like are self-luminous display panels.

By providing the self-luminous display panel with a backlight, brightness can be enhanced.

The enhancement of brightness is needed when, for example, display appears dark because of deterioration of the self-luminous display panel, or appears dim at a bright place.

When the self-luminous display panel is provided with the backlight, a pair of electrodes included in a light-emitting element of the display panel preferably has a light-transmitting property so that light can be transmitted through the light-emitting region of the self-luminous display panel.

The mark refers to, for instance, a tile pattern (e.g., FIG. 22A), a plurality of rings (e.g., FIG. 22B), a symbol, a letter, a number, a geometrical pattern, etc., without limitation.

In order that more uniform light emission can be obtained from one side, it is preferable to use the structures such as the tile pattern (e.g., FIG. 22A) and the plurality of rings (e.g., FIG. 22B) in which the island-shaped electroluminescence layers are densely arranged.

As the light guide plate, a diffusing agent may be mixed into a resin plate (e.g., an acrylic plate) to diffuse light, or a resin plate (e.g., an acrylic plate) may be subjected to surface processing to diffuse light, for instance, although the present invention is not limited to these examples. Note that the light guide plate may be a film sheet. Note also that the light guide plate 2002 is not an essential element and is provided as needed.

This embodiment can be combined with any other embodiment.

Embodiment 15

Emission color may be different in each unit.

Further, the island-shaped electroluminescence layers which are stacked in the unit may each exhibit a different emission color.

Furthermore, the island-shaped electroluminescence layers which are stacked in the unit may each exhibit a different emission color, and the light emission color may be different in each unit.

Exhibiting a different emission color in this manner is preferable because a variety of colors, marks, and the like can be expressed in this case.

This embodiment can be combined with any other embodiment.

This application is based on Japanese Patent Application serial No. 2009-165396 filed with Japan Patent Office on Jul. 14, 2009, the entire contents of which are hereby incorporated by reference.

What is claimed is:

1. A light source comprising:
a first electrode;
a plurality of first island-shaped electroluminescence layers over the first electrode;
an intermediate nonconductive layer to cover the first electrode and the plurality of first island-shaped electroluminescence layers;
a plurality of second island-shaped electroluminescence layers over the intermediate nonconductive layer; and
a second electrode to cover the intermediate nonconductive layer and the plurality of second island-shaped electroluminescence layers, wherein the plurality of first island-shaped electroluminescence layers and the plurality of second island-shaped electroluminescence layers are provided at positions corresponding to one another.

2. The light source according to claim 1, wherein an area of one of the plurality of first island-shaped electroluminescence layers is different from an area of one of the plurality of second island-shaped electroluminescence layers.

3. The light source according to claim 1, wherein an area of one of the plurality of second island-shaped electroluminescence layers is larger than an area of one of the plurality of first island-shaped electroluminescence layers.

4. A device comprising:
the light source according to claim 1; and
a light guide plate provided to face the light source.

5. The device according to claim 4, wherein the light source is a dual-emission light source.

6. A device comprising:
the light source according to claim 1;
a display panel; and
a light guide plate between the light source and the display panel.

7. The device according to claim 6, wherein the light source is a dual-emission light source.

8. A light source comprising:
a first electrode;
a plurality of first island-shaped electroluminescence layers over the first electrode;
a first intermediate nonconductive layer to cover the first electrode and the plurality of first island-shaped electroluminescence layers;
a plurality of second island-shaped electroluminescence layers over the first intermediate nonconductive layer;
a second intermediate nonconductive layer to cover the first intermediate nonconductive layer and the plurality of second island-shaped electroluminescence layers;
a plurality of third island-shaped electroluminescence layers over the second intermediate nonconductive layer; and
a second electrode to cover the second intermediate nonconductive layer and the plurality of third island-shaped electroluminescence layers,
wherein the plurality of first island-shaped electroluminescence layers, the plurality of second island-shaped electroluminescence layers, and the plurality of third island-shaped electroluminescence layers are provided at positions each corresponding to one another.

9. The light source according to claim 8, wherein an area of one of the plurality of first island-shaped electroluminescence layers is different from an area of one of the plurality of second island-shaped electroluminescence layers and an area of one of the plurality of third island-shaped electroluminescence layers.

10. The light source according to claim 8, wherein an area of one of the plurality of third island-shaped electroluminescence layers is larger than an area of one of the plurality of first island-shaped electroluminescence layers and an area of one of the plurality of second island-shaped electroluminescence layers.

11. A device comprising:
the light source according to claim 8; and
a light guide plate provided to face the light source.

12. The device according to claim 11, wherein the light source is a dual-emission light source.

13. A device comprising:
the light source according to claim 8;
a display panel; and
a light guide plate between the light source and the display panel.

14. The device according to claim 13, wherein the light source is a dual-emission light source.

15. A light source comprising:
a plurality of units each including a pair of electrodes, a plurality of island-shaped electroluminescence layers stacked between the pair of electrodes, and at least one intermediate nonconductive layer provided at a position for separating each of the plurality of island-shaped electroluminescence layers,
wherein the plurality of units include the pair of electrodes and the at least one intermediate nonconductive layer in common, and
wherein the plurality of island-shaped electroluminescence layers is separately provided for each of the plurality of units.

16. The light source according to claim 15, wherein the plurality of island-shaped electroluminescence layers which is stacked each have a different area.

17. The light source according to claim 15, wherein one of the pair of electrodes is provided to cover an uppermost island-shaped electroluminescence layer of the plurality of island-shaped electroluminescence layers, and the uppermost island-shaped electroluminescence layer has the largest area in the plurality of island-shaped electroluminescence layers which is stacked.

18. A device comprising:
the light source according to claim 15; and
a light guide plate provided to face the light source.

19. The device according to claim 18, wherein the light source is a dual-emission light source.

20. A device comprising:
the light source according to claim 15;
a display panel; and
a light guide plate between the light source and the display panel.

21. The device according to claim 20, wherein the light source is a dual-emission light source.

* * * * *